United States Patent
Lee et al.

(10) Patent No.: US 11,250,815 B2
(45) Date of Patent: Feb. 15, 2022

(54) ELECTRONIC DEVICE AND METHOD FOR PROVIDING SPLIT SCREEN

(71) Applicant: Samsung Electronics Co., Ltd., Suwon-si (KR)

(72) Inventors: Sangeun Lee, Suwon-si (KR); Dasom Kim, Suwon-si (KR); Joonhwan Kim, Suwon-si (KR); Jieun Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/514,378

(22) Filed: Jul. 17, 2019

(65) Prior Publication Data
US 2020/0027425 A1    Jan. 23, 2020

(30) Foreign Application Priority Data

Jul. 17, 2018  (KR) ..................... 10-2018-0082924

(51) Int. Cl.
*G09G 5/14*   (2006.01)
*G06F 3/0481*   (2013.01)
(Continued)

(52) U.S. Cl.
CPC ............. *G09G 5/14* (2013.01); *G06F 1/1652* (2013.01); *G06F 3/0416* (2013.01);
(Continued)

(58) Field of Classification Search
CPC .. G06F 3/0416; G06F 1/3262; G06F 3/04817; G06F 3/04886; G06F 1/1677;
(Continued)

(56) References Cited

U.S. PATENT DOCUMENTS

| 8,543,166 B2 | 9/2013 | Choi et al. |
| 9,733,815 B2 | 8/2017 | Xia et al. |

(Continued)

FOREIGN PATENT DOCUMENTS

| EP | 3 467 629 A2 | 4/2019 |
| JP | 2005-020743 A | 1/2005 |

(Continued)

OTHER PUBLICATIONS

International Search Report dated Jun. 25, 2019, issued in International Patent Application No. PCT/KR2019/003335.

(Continued)

*Primary Examiner* — Yaron Cohen
(74) *Attorney, Agent, or Firm* — Jefferson IP Law, LLP

(57) ABSTRACT

An electronic device is provided. The electronic device includes at least one memory storing instructions, a display, and at least one processor. The at least one processor is, when executing the instructions, configured to display a first screen in a first region using the display, while displaying the first screen in the first region, receive a specified input, and in response to receiving the specified input, display at least a portion of the first screen in a first sub region included in the first region and display a second screen and a third screen in a second sub region, which is included in the first region, is disposed beside the first sub region, and has an area smaller than the area of the first sub region.

20 Claims, 17 Drawing Sheets

(51) Int. Cl.
*G06F 3/041* (2006.01)
*G06F 3/0488* (2013.01)
*G06F 3/0484* (2013.01)
*G06F 1/16* (2006.01)

(52) U.S. Cl.
CPC ...... *G06F 3/04817* (2013.01); *G06F 3/04845* (2013.01); *G06F 3/04886* (2013.01); *G06F 2203/04803* (2013.01); *G09G 2340/045* (2013.01); *G09G 2340/0442* (2013.01); *G09G 2354/00* (2013.01); *G09G 2360/12* (2013.01); *G09G 2380/02* (2013.01)

(58) Field of Classification Search
CPC .............. G06F 3/04883; G06F 1/1641; G06F 3/04845; G06F 1/3215; G06F 1/1652; G06F 2203/04803; G09G 5/14; G09G 2360/12; G09G 2340/045; G09G 2354/00; G09G 2340/0442; G09G 2380/02
See application file for complete search history.

(56) References Cited

U.S. PATENT DOCUMENTS

| | | | |
|---|---|---|---|
| 2004/0263686 A1 | 12/2004 | Kim | |
| 2013/0305184 A1* | 11/2013 | Kim | G06F 3/04886 715/781 |
| 2016/0070305 A1 | 3/2016 | Kim et al. | |
| 2016/0085319 A1* | 3/2016 | Kim | G06F 3/0487 345/156 |
| 2016/0132074 A1 | 5/2016 | Kim et al. | |
| 2017/0075640 A1* | 3/2017 | Chun | G06F 3/04847 |
| 2017/0289427 A1* | 10/2017 | Eum | H04N 5/232935 |
| 2018/0039387 A1 | 2/2018 | Cheong et al. | |
| 2018/0374452 A1 | 12/2018 | Choi et al. | |

FOREIGN PATENT DOCUMENTS

| | | |
|---|---|---|
| JP | 2017-098736 A | 6/2017 |
| KR | 10-2013-0126428 A | 11/2013 |
| KR | 10-2015-0012234 A | 2/2015 |
| KR | 10-2015-0136440 A | 12/2015 |
| KR | 10-2016-0033507 A | 3/2016 |
| KR | 10-2016-0038510 A | 4/2016 |
| KR | 10-2017-0058223 A | 5/2017 |
| KR | 10-2018-0004427 A | 1/2018 |
| KR | 10-2018-0015532 A | 2/2018 |
| WO | 2016/052814 A1 | 4/2016 |

OTHER PUBLICATIONS

European Search Report dated Jun. 18, 2021, issued in European Patent Application No. 19838468.7-1210.

* cited by examiner

ELECTRONIC DEVICE AND METHOD FOR PROVIDING SPLIT SCREEN

CROSS-REFERENCE TO RELATED APPLICATION(S)

This application is based on and claims priority under 35 U.S.C. § 119(a) of a Korean patent application number 10-2018-0082924, filed on Jul. 17, 2018, in the Korean Intellectual Property Office, the disclosure of which is incorporated by reference herein in its entirety.

BACKGROUND

1. Field

The disclosure relates to an electronic device for providing a split screen and an operation method therefor.

2. Description of the Related Art

Electronic devices that enable users to readily access multimedia content are being developed. Such an electronic device may provide multimedia content via a display thereof.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device which has a display larger than that of a smart phone may require a solution for providing various types of information in parallel. Portable electronic devices that provide displays larger than those of smart phones, such as phablets, tablets, or the like, have come to be popular.

The technical subjects pursued in the disclosure are not limited to the above mentioned technical subjects, and other technical subjects which are not mentioned may be clearly understood, through the following descriptions, by those skilled in the art of the disclosure.

Additional aspects will be set forth in part in the description which follows and, in part, will be apparent from the description, or may be learned by practice of the presented embodiments.

In accordance with an aspect of the disclosure, an electronic device is provided. The electronic device includes at least one memory storing instructions, a display, and at least one processor, wherein the processor is, when executing the instructions, configured to display a first screen in a first region using the display, while displaying the first screen in the first region, receive a specified input, and in response to receiving the specified input, display at least a portion of the first screen in a first subregion included in the first region and display a second screen and a third screen in a second subregion, which is included in the first region, is disposed beside the first subregion, and has an area smaller than the area of the first subregion.

In accordance with another aspect of the disclosure, a method of operating an electronic device is provided. The method includes displaying a first screen in a first region using the display, while displaying the first screen in the first region, receiving a specified input, and in response to receiving the specified input, displaying at least a portion of the first screen in a first subregion included in the first region and displaying a second screen and a third screen in a second subregion, which is included in the first region, is disposed beside the first subregion, and has an area smaller than that of the first subregion.

In accordance with another aspect of the disclosure, an electronic device and a method therefor may provide a split screen, thereby providing improved user experience.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
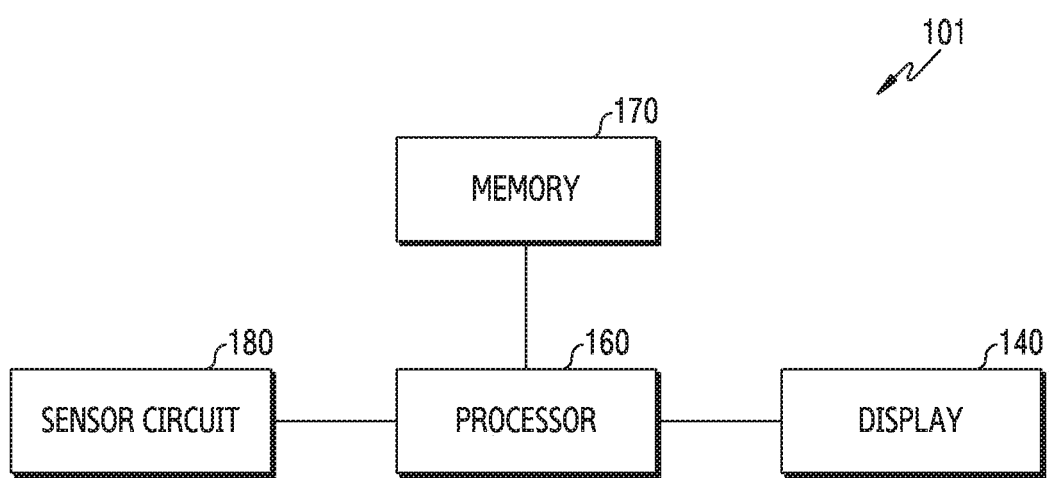
FIG. 1A is a diagram illustrating an example of the functional configuration of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the disclosure may modify various components regardless of the order and/or the importance but does not limit the corresponding components. For example, a first user device and a second user device indicate different user devices although both of them are user devices. A first element may be termed a second element, and similarly, a second element may be termed a first element without departing from the scope of the disclosure.

When it is mentioned that one element (e.g., a first element) is "(operatively or communicatively) coupled with/to or connected to" another element (e.g., a second element), it should be construed that the one element is directly connected to the another element or the one element is indirectly connected to the another element via yet another element (e.g., a third element). In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., Central Processing Unit (CPU) or Application Processor (AP)) that can perform the corresponding operations by executing one or more software programs stored in a memory device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

An electronic device according to various embodiments of the disclosure may include at least one of a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device, an electronic devices for a ship (e.g., a navigation device for a ship, and a gyro-compass), avionics, security devices, an automotive head unit, a robot for home or industry, an Automated Teller Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the disclosure may be a combination of one or more of the aforementioned various devices. According to some embodiments, the electronic device may be a flexible electronic device or a foldable electronic device. Also, the electronic device according to embodiments of the disclosure is not limited to the above-described devices, but may include other types of electronic devices or new types of electronic devices based on the advancement and development of technology.

In the disclosure, the term "user" may indicate a person using an electronic device or a device (e.g., an artificial intelligence electronic device) using an electronic device.

Hereinafter, referring to the enclosed drawings, various embodiments will be described in detail. For ease of description, the sizes of components may be scaled up or down in the drawings. For example, the size and thickness of each component in the drawings are merely illustrated for ease of description, and the disclosure is not always limited by the illustrations.

FIG. 1A is a diagram illustrating an example of the functional configuration of an electronic device according to an embodiment of the disclosure.

Referring to FIG. 1A, an electronic device 101 may include a processor 160, a memory 170, a display 140, and a sensor circuit 180.

The processor 160 may control the overall operation of the electronic device 101. For example, the processor 160 may execute applications that provide advertisements, access to the Internet, games, videos, or the like. The processor 120 may include a single processor core (single core), or may include multiple processor cores. For example, the processor 160 may include a multi-core processor such as a dual-core processor, a quad-core processor, a hexa-core processor, and the like. The processor 160 may further include a cache memory that is located inside or outside the processor 210.

The processor 160 may receive commands from other components of the electronic device 101, may interpret the received commands, and may execute calculations or process data on the basis of the interpreted commands.

The processor 160 may process data or signals produced or generated by an application. For example, the processor 160 may request instructions, data, or signals from the memory 130 so as to execute or control an application. The processor 160 may record (or store) or update instructions, data, or signals in the memory 170 so as to execute or control an application.

The processor 160 may interpret or process messages, data, instructions, or signals received from the memory 170, the display 140, or the sensor circuit 180. The processor 160 may produce new messages, data, instructions, or signals on the basis of received messages, data, instructions, or signals. The processor 160 may provide the processed or produced messages, data, instructions, or signals to the memory 170, the display 140, or the sensor circuit 180.

A part or the whole of the processor 160 may be electrically or operably (or operatively) coupled with, or connected to, other components of the electronic device 101 (e.g., the memory 130, the display 140, or the sensor circuit 180).

The processor 160 may be configured with one or more processors. For example, the processor 160 may include one or more processors selected from among an application processor (AP) for controlling a program in a higher layer such as an application or the like, a graphics processing unit (GPU) for controlling the display 140, or a communications processor (CP) for controlling a communication function.

The memory 170 may store instructions for controlling the electronic device 101, control instruction code, control data, or user data. For example, the memory 130 may include applications, an operating system (OS), middleware, and a device driver.

The memory 170 may include one or more selected from among a volatile memory and a nonvolatile memory. The volatile memory may include a dynamic random access memory (DRAM), a static RAM (SRAM), a synchronous DRAM (SDRAM), a phrase-change RAM (PRAM), a magnetic RAM (MRAM), a resistive RAM (RRAM), a ferroelectric RAM (FeRAM), and the like. The nonvolatile memory may include a read-only memory (ROM), a programmable ROM (PROM), an electrically programmable ROM (EPROM), an electrically erasable ROM (EEPROM), a flash memory, and the like.

The memory 170 may include a nonvolatile medium, such as a hard disk drive (HDD), a solid state disk (SSD), an embedded multimedia card (eMMC), and a universal flash storage (UFS).

The display 140 may output content, data, or signals. According to various embodiments, the display 140 may display image data processed by the processor 160.

The display 140 may be configured with an integrated touch screen by being coupled with a plurality of touch sensors (not illustrated) capable of receiving a touch input or the like. If the display 140 is configured with a touch screen, the plurality of touch sensors may be disposed on the display 140 or below the display 140.

The display 140 may include a display (e.g., a foldable display), at least a part of which is foldable. If the display 140 is implemented as a foldable display, the electronic device 101 may be provided in a structure that enables the display 140 to be folded.

Figure 1B:
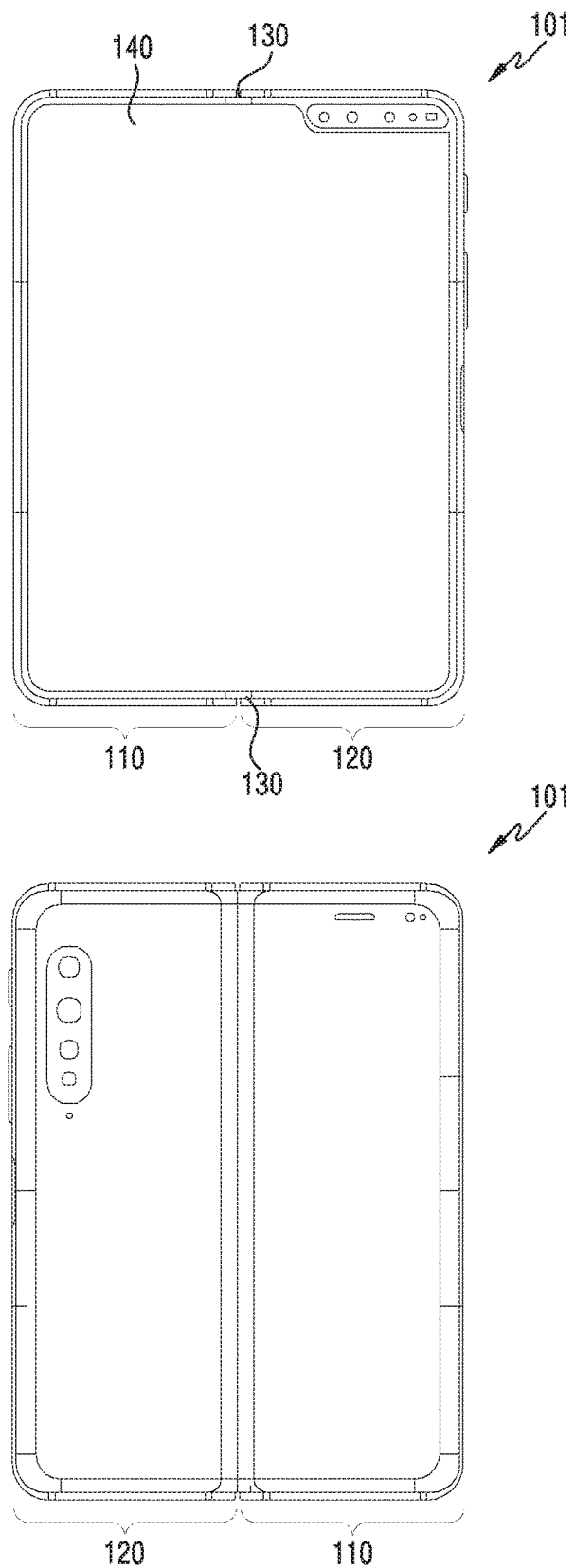
FIG. 1B is a diagram illustrating an example of the front view and the rear view of a foldable electronic device in an unfolded state according to an embodiment of the disclosure.

FIG. 1B is a diagram illustrating an example of the front view and the rear view of a foldable electronic device in an unfolded state according to an embodiment of the disclosure.

Referring to FIG. 1B, the electronic device 101 may include a first housing 110, a second housing 120, a folding part 130, and/or the display 140.

The first housing 110 may include a first surface and a second surface facing opposition direction of the first surface. The second housing 120 may include a third surface and a fourth surface facing opposition direction of the third surface.

The first housing 110 and the second housing 120 may be connected by the folding part 130. For example, the folding part 130 may be configured to pivotably or rotatably connect the first housing 110 and the second housing 120 by connecting a side surface of the first housing 110 and a side surface of the second housing 120 that faces the side surface of the first housing 110.

The display 140 may be disposed on the first housing 110 and the second housing 120 across the folding part 130. The display 140 may be installed to be supported by the first housing 110 and the second housing 120. The display 140 may be disposed on the first surface and the third surface across the folding part 130. The display 140 may include a first region corresponding to the first surface and a second region corresponding to the third surface.

The electronic device 101 may be folded along the folding part 130. For example, the folding part 130 may be disposed between the first housing 110 and the second housing 120, so that the electronic device 101 is bent, bowed, or folded. The first housing 110 may be connected to the second housing 120 via the folding part 130, and may rotate on the basis of the folding part 130. The second housing 120 may be connected to the first housing 110 via the folding part 130, and may rotate on the basis of the folding part 130. The first housing 110 and the second housing 120 rotate on the basis of the folding part 130, and may be folded to face each other. The first housing 110 and the second housing 120 may be substantially superimposed, or may overlap each other.

The electronic device 101 may provide a first state in which the first housing 110 and the second housing 120 are folded out using the folding part 130. In the first state, the first surface may be substantially flush with the third surface. The electronic device 101 may fold out the folding part 130 and may provide the first state in which the first housing 110 is substantially flush with the second housing 120. The first state may be the state in which a first region, a second region, and a third region are providable within the field of view (or the angle of view) of a user facing toward the front side of the electronic device 101. The first region corresponds to the first surface of the entire area of the display 140. The second region corresponds to the third surface of the entire area of the display 140. The third region encloses the folding part 130 of the entire area of the display 140. The first state may be referred to as an outspread state (or outspreading state), or may be referred to as an unfolded state.

The electronic device 101 may provide a second state in which the first housing 110 and the second housing 120 are folded in using the folding part 130. In the second state, the first surface may be superimposed on the third surface. The electronic device 101 may provide the second state in which the folding part 130 is folded in such that the front side (e.g., the first surface) of the first housing 110 and the front side (e.g., the third surface) of the second housing 120 face each other, and the first housing 110 and the second housing 120 are disposed in parallel. The second state may be the state in which the display 101 is covered within the field of vision of a user facing toward the front view of the electronic device 101. The second state may be a folded state.

The display 140 may be disposed on the front side (e.g., the third surface) of the second housing 120 across the first housing 110 and the folding part 130. The electronic device 101 may be folded along the folding part 130. The display 140 is disposed in the first housing 110 and the second housing 120 across the folding part 130, and may be folded in by a folding operation of the electronic device 101. For example, in the display 140, a third region disposed on the folding part 130 may be bent by a folding operation of the electronic device 100, unlike the first region disposed on the first surface of the first housing 110 and the second region disposed on the third surface of the second housing 120. The third region may be curved and bent to prevent the display 140 from being damaged.

One or more of the first region or the second region may further include a bent region such as the third region. For example, an end part that is far from the center of the first housing 110 may include a region provided in a round shape. As another example, an end part that is far from the center of the second housing 120 may include a region provided in a round shape. A bent display region included in the first region and a bent display region included in the second region may be disposed at an edge of the first housing 110 and an edge of the second housing 120, respectively, and may be referred to as edge displays.

The sensor circuit 180 may include at least one of a first sensor for obtaining information associated with the posture of the electronic device 101 and a second sensor for obtaining information associated with the angle between the first housing 110 and the second housing 120 of the electronic device 101.

The first sensor may include one or more sensors selected from among a sensor for obtaining data associated with variation in the linear movement of the electronic device 101, a sensor for obtaining data associated with variation in the rotational movement of the electronic device 101, or a sensor for obtaining data associated with the geographical position of the electronic device 101. For example, the first sensor may include one or more from among a geomagnetic sensor, a gyro sensor, or an infrared light sensor.

The second sensor may obtain information associated with the angle between the first housing 110 and the second housing 120 of the electronic device 101, so as to provide information associated with the state (e.g., the first state and the second state) of the electronic device 101. According to various embodiments, the second sensor may be included in the folding part 130.

The processor 160 may display various types of information using the display 140. The information may be displayed in at least one of the first region, the second region disposed below the first region, and the third region disposed above the first region. The second region may include at least one executable object (e.g., an executable object for providing a step-back function, an executable object for inquiring about a running application, an executable object for providing a cancel function, and the like) for controlling a screen displayed in the first region. The at least one executable object displayed in the second region may disappear depending on at least one of a type of a screen displayed in the first region and a type of content provided via the screen displayed in the first region. The at least one executable object displayed in the second region may be maintained independently from, or regardless of, switching of a screen displayed in the first region. The second region may be referred to as a control region. The third region may include at least one indicator for indicating the state of the electronic device 101 (e.g., an indicator for indicating the quality of cellular communication, an indicator for indicating whether a Wi-Fi function is enabled, an indicator indicating the remaining quantity of charge in a battery, and the like). The at least one indicator displayed in the third region may disappear depending on at least one of a type of a screen displayed in the first region and a type of content provided via the screen displayed in the first region. The at least one indicator displayed in the third region may be maintained independently from, or regardless of, switching of a screen displayed in the first region.

Figure 2:
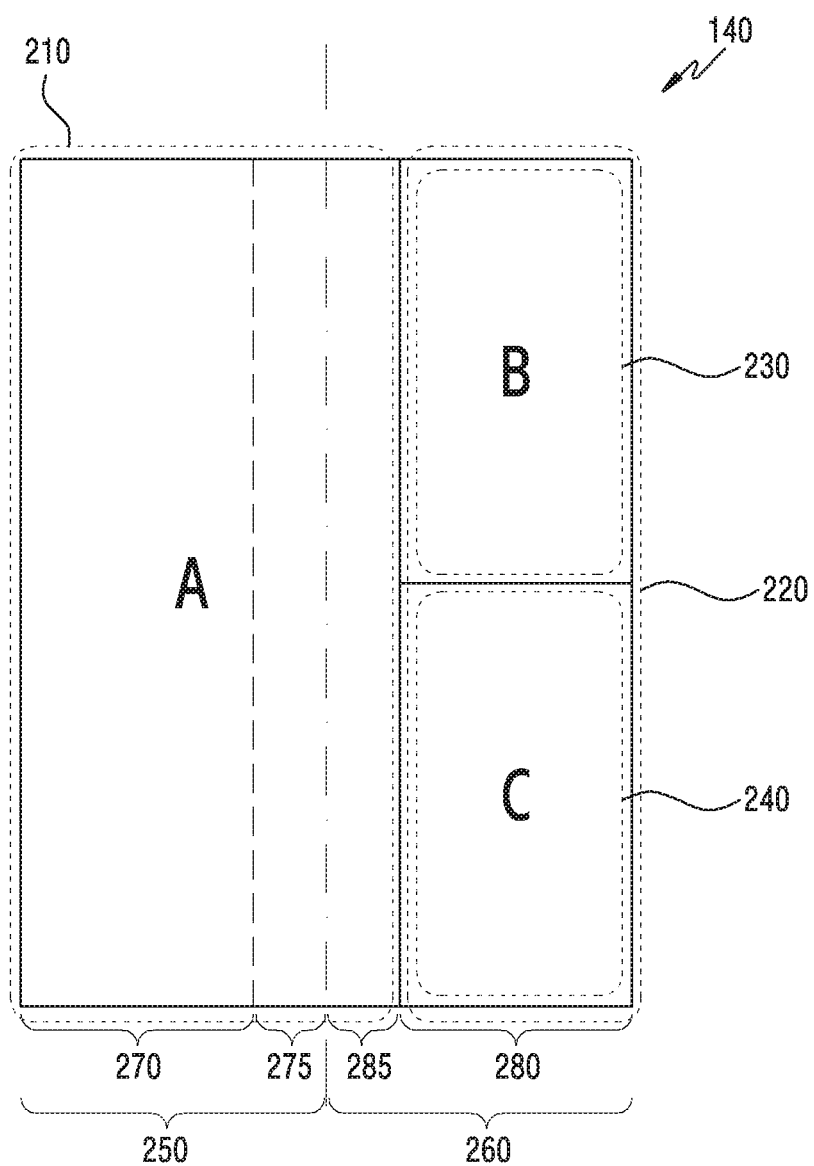
FIG. 2 is a diagram illustrating the structure of a split screen displayed in an electronic device according to an embodiment of the disclosure.

FIG. 2 is a diagram illustrating the structure of a split screen displayed in an electronic device according to an embodiment of the disclosure.

Referring to FIG. 2, the first region may display a split screen. For example, the first region may be configured with a first subregion 210 and a second subregion 220, or may include the first subregion 210 and the second subregion 220. The second subregion 220 may be disposed beside the first subregion 210. The area of the second subregion 220 may be smaller than the area of the first subregion 210. However, the disclosure is not limited thereto. The split screen may indicate the state in which a plurality of screens is provided concurrently or in which a plurality of screens is provided together. Since the area of the first subregion 210, defined while the split screen is provided, is larger than the area of the second subregion 220, a user may intuitively recognize which region is a main region while the split screen is provided. The electronic device 101 according to various embodiments may provide an improved user experience via the intuitive recognition.

As described above, the area of the first subregion 210 may be larger than the area of the second subregion 220. Given that an area larger than the area of the second subregion 220 is provided, the first subregion 210 may be referred to as a main display region.

Given that an area smaller than the area of the first subregion 210 is provided, the second subregion 220 may be referred to as an auxiliary display region (or an additional display region). The second subregion 220 may provide a single screen or multiple screens depending on the setting or the configuration of the electronic device 101. For example, the second subregion 220 may provide a second screen 230 and a third screen 240 while a first screen is provided in the first subregion 210. The third screen 240 may be disposed below the second screen 230.

When the display 140 is configured as a foldable display, the first region may include a plurality of portions. For example, when the display 140 is configured as a foldable display, the first region may be configured with a portion 250 corresponding to the first surface of the first housing 110 and a portion 260 corresponding to the third surface, or may include the portion 250 and the portion 260. The portion 250 may include a first portion 270 disposed on the first surface of the first housing 110 and a second portion 275 that is disposed on the first surface, beside the first portion 270, and on at least a portion of the folding portion 130, or may be configured with the first portion 270 and the second portion 275. The portion 260 may include a third portion 280 that is disposed on the third surface of the second housing 120 and a fourth portion 285 that is disposed on the third surface, beside the third portion 280, and on at least a portion of the folding portion 130, or may be configured with the third portion 280 and the fourth portion 285.

While the electronic device 101 is in the state of providing the split screen, the first subregion 210 and the second subregion 220 may provide different screens.

Figure 3A:
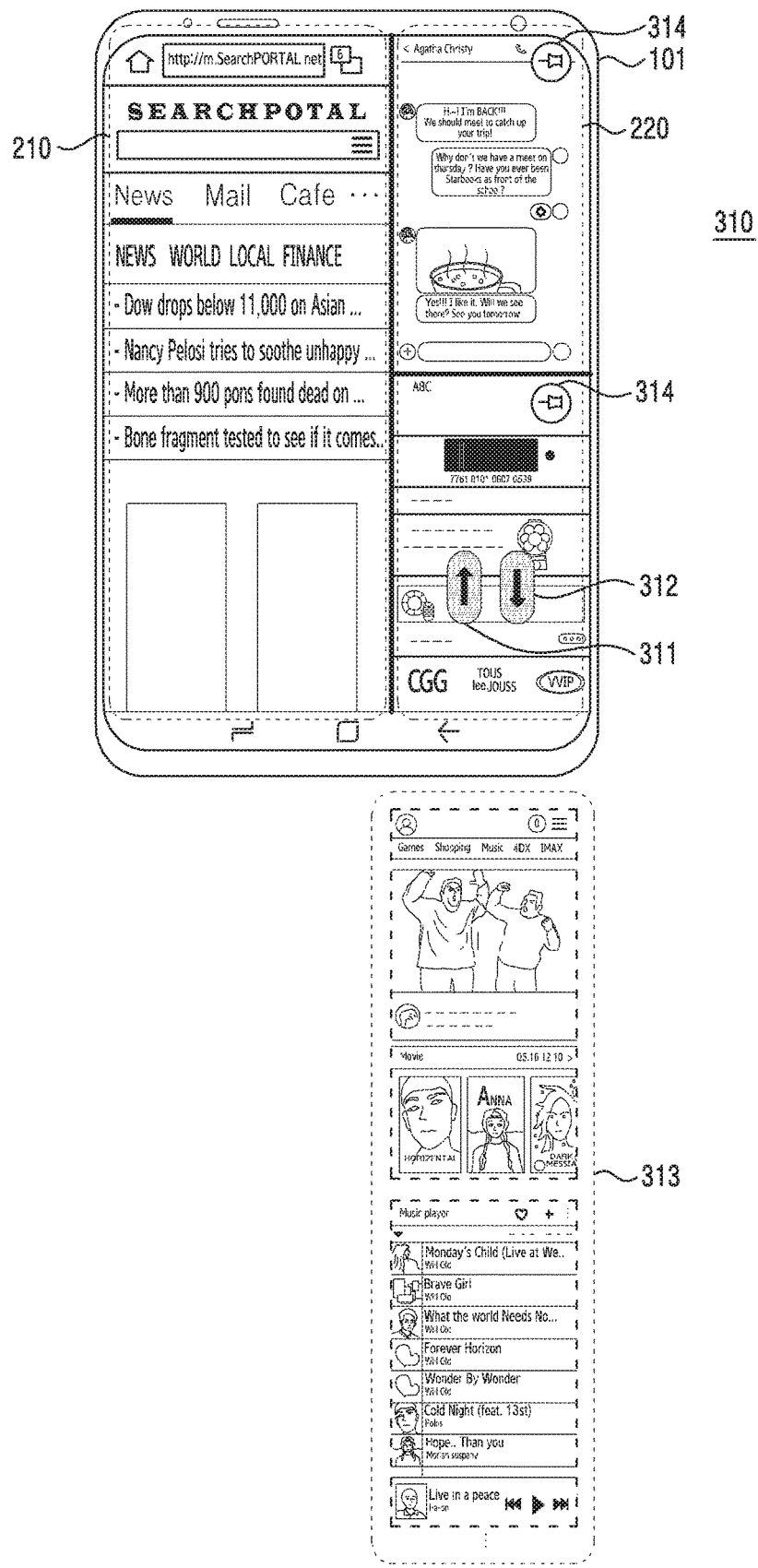
FIG. 3A is a diagram illustrating an example of a split screen displayed in an electronic device according to an embodiment of the disclosure.

FIG. 3A is a diagram illustrating an example of a split screen displayed in an electronic device according to an embodiment of the disclosure.

Referring to FIG. 3A, in a state 310, while providing the split screen using the display 140, the processor 210 displays a user interface of a first application in the first subregion 210 and displays a user interface of a second application and a user interface of a third application in the second subregion 220. The state 310 may indicate the state in which the electronic device 101 displays the split screen using the display 140. The first application may be an application that was executed in the foreground before the electronic device 101 began to provide the split screen. For example, the user interface of the first application may be the screen that was displayed in the entire first region while the electronic device 101 was in the state before providing the split screen. Switching to the split screen may be performed by a specified input. Switching to the split screen will be described below with reference to FIGS. 4A and 4B.

The second application may be one of a plurality of applications being (or existing) in the background while the user interface of the first application is displayed in the entirety of the first region or while only the first application is in the foreground. The second application may be an application that was in the foreground immediately before only the first application was brought to the foreground.

The third application may be an application that was in the foreground immediately before the second application was brought to the foreground, or may be an application that was in the foreground together with the second application.

The processor 160 may switch at least one screen displayed in the second subregion 220, in response to a user input. For example, when the electronic device 101 is in the state of executing at least one application, other than the first application, the second application, and the third application, in the background, the processor 160 may display, in the second subregion 220, a user interface 313 of the at least one application, to which switching from at least one of the user interface of the second application and the user interface of the third application is performed, in response to reception of a drag input 311 provided in a first direction in the second subregion 220 or reception of a drag input 312 provided in a second direction.

The second subregion 220 may further display an object 314 for maintaining at least one of the user interface of the second application or the user interface of the third application, independently from the drag input 311 or the drag input 312, while the split screen is provided.

The object 314 may be displayed to be superimposed on or to float on at least one of the user interface of the second application or the user interface of the third application. The object 314 may move on the basis of a drag input on the object 314. The processor 160 may maintain or fix a user interface disposed below the object 314 independently from another input (e.g., the drag input 311 or the drag input 312), on the basis of a touch input on the object 314.

For example, the processor 160 may receive a touch input on the object 314 that is superimposed on the user interface of the second application while the user interface of the second application and the user interface of the third application are displayed in the second subregion 220. In response to reception of a touch input on the object 314, the processor 160 configures the user interface of the second application to be in a fixed state or a pinned state. When the drag input 311 or the drag input 312 is received while the user interface of the second application in the fixed state is displayed in at least a portion of the second subregion 220, the processor 160 may maintain the user interface of the second application, and may switch only the user interface of the third application to the at least one user interface 313 of at least one application. The location where the drag input 311 or the drag input 312 is initiated may be the user interface of the second application, or may be the user interface of the third application.

As another example, the processor 160 may receive a touch input on the object 314 that is superimposed on the user interface of the third application, while the user interface of the second application and the user interface of the third application are being displayed in the second subregion 220. In response to reception of the touch input on the object 314, the processor 160 may configure the user interface of the third application to be in the fixed state. When the drag input 311 or the drag input 312 is received while the user interface of the third application in the fixed state is displayed in at least a portion of the second subregion 220, the processor 160 may maintain the user interface of the third application, and may switch only the user interface of the second application to the at least one user interface 313 of at least one application. The location where the drag input 311 or the drag input 312 is initiated may be the user interface of the second application, or may be the user interface of the third application.

Figure 3B:
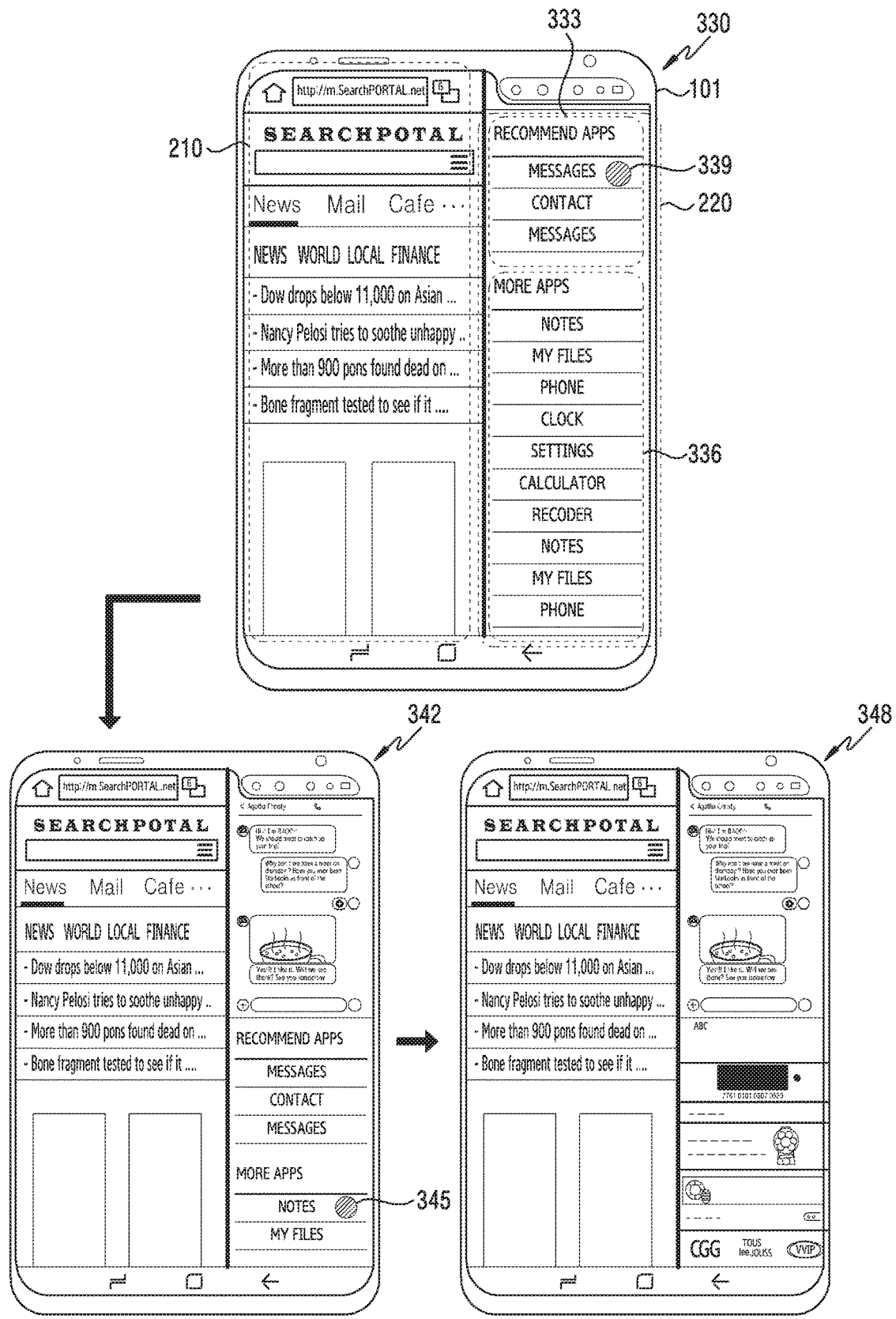
FIG. 3B is a diagram illustrating another example of a split screen displayed in an electronic device according to an embodiment of the disclosure.

FIG. 3B is a diagram illustrating another example of a split screen displayed in an electronic device according to an embodiment of the disclosure.

Referring to FIG. 3B, in a state 330, while providing the split screen using the display 140, the processor 160 displays a user interface of a first application in the first subregion 210, and displays at least a part of a list including a plurality of items indicating a plurality of applications other than the first application in the second subregion 220. The list may include a first sub-list 333 and a second sub-list 336, or may be configured with the first sub-list 333 and the second sub-list 336.

The first sub-list 333 may include at least one item respectively indicating at least one application that was recently executed. The first sub-list 333 may include at least one item respectively indicating at least one application that is frequently executed. The first sub-list 333 may include at least one item respectively indicating at least one application which is recommended on the basis of a user's application usage pattern. The first sub-list 333 may include at least one item respectively indicating at least one application which is interoperable with the first application. However, the disclosure is not limited thereto.

The second sub-list 336 may include a plurality of items respectively indicating a plurality of applications installed in the electronic device 101. However, the disclosure is not limited thereto. The arrangement (or order) of the at least one item included in the first sub-list 333, or the arrangement (or order) of the plurality of items included in the second sub-list 336 may be changed according to a user setting or configuration of the electronic device 101. The at least one item included in the first sub-list 333 or at least one of the plurality of items included in the second sub-list 336 may be scrolled in response to a drag input on the second subregion 220.

In the state 330, the processor 160 may receive input 339 for selecting one of the items included in the first sub-list 333 or the second sub-list 336. In response to reception of the input 339, the processor 160 may display a user interface of an application indicated by the selected item in the second subregion 220, as shown in the state 342. In response to reception of the input 339, the processor 160 may move the list in the second subregion 220 as shown in the state 342, and may display at least a portion of the list below the user interface of the application indicated by the selected item.

The processor 160 may receive input 345 for selecting one of the plurality of items included in the list displayed below the region that displays the user interface of the application indicated by the selected item, in the state 342. In response to reception of the input 345, the processor 160 may display a user interface of another application indicated by an item selected by the input 345, below the user interface of the application that has been newly displayed in the state 342, as shown in the state 348. As shown in the state 348, when user interfaces of two or more applications are displayed in the second subregion 220, the processor 160 may interrupt display of the list in the second subregion 220. However, the disclosure is not limited thereto.

Figure 3C:
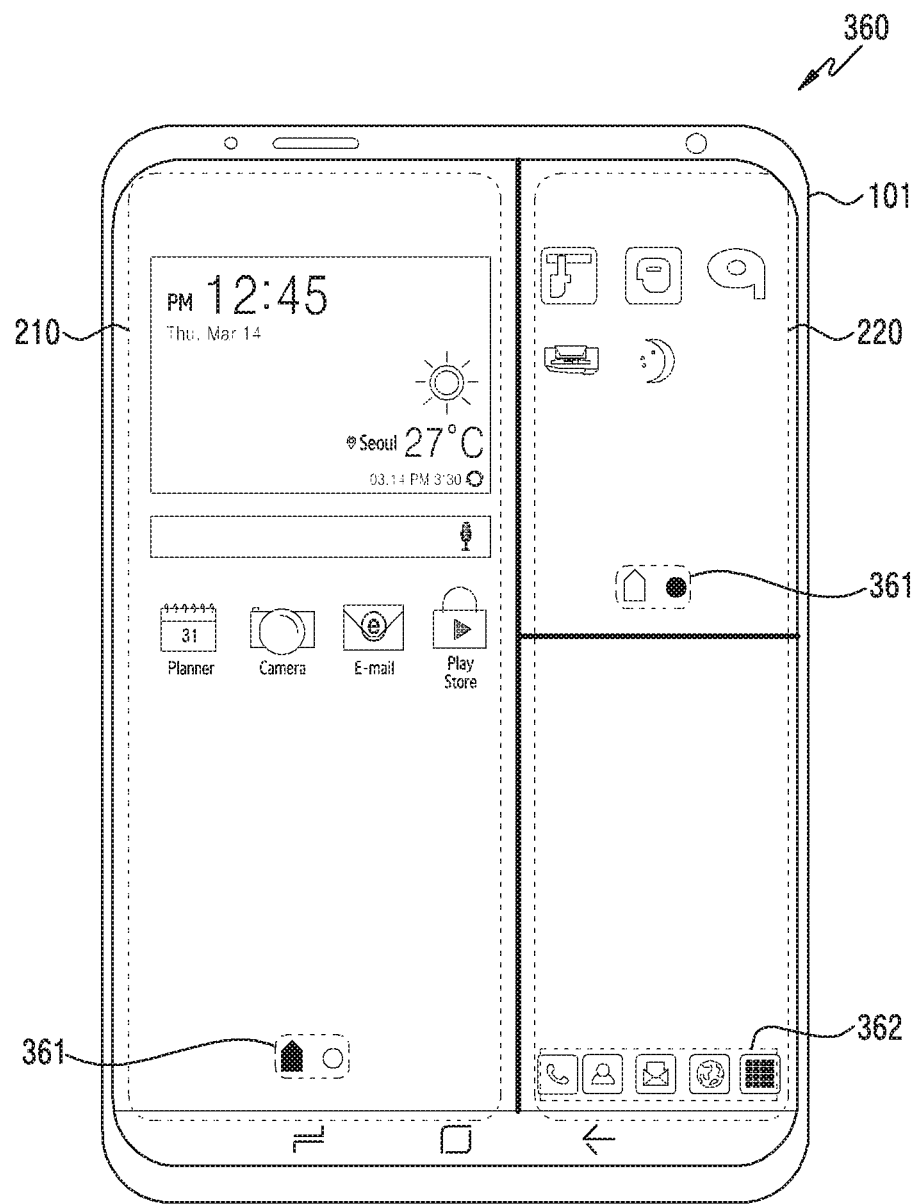
FIG. 3C is a diagram illustrating another example of a split screen displayed in an electronic device according to an embodiment of the disclosure.

FIG. 3C is a diagram illustrating another example of a split screen displayed in an electronic device according to an embodiment of the disclosure.

Referring to FIG. 3C, in a state 360, while providing the split screen using the display 140, the processor 160 may display a first page among a plurality of pages included in a home screen (or wall paper) in the first subregion 210, and may display a second page among the plurality of pages and at least one icon (e.g., Top 5 icons) in the second subregion 220. The first page may be the page that was displayed on the home screen before the electronic device 101 provided the split screen, among the plurality of pages configured in the home screen. The first page may include at least one selected from among at least one widget or at least one icon respectively indicating at least one application. The first subregion 210 displaying the first page may further include a plurality of page indicators 361 for respectively indicating the plurality of pages. A page indicator for indicating the first page, among the plurality of page indicators 361, may be highlighted in order to distinguish the same from the remaining page indicators.

The second page displayed in the second subregion 220 may be the page previous to the first page or the page subsequent to the first page. The second page may include at least one from among at least one widget or at least one icon for respectively indicating at least one application. At least one icon 362 (e.g., Top 5 icons) displayed below the second page in the second subregion 220 may include an icon disposed below any one page of the plurality of pages before the electronic device 101 provides the split screen. The at least one icon 362 displayed below the second page in the second subregion 220 may be an icon that is maintained independently from input for switching from the first page to any one page of the plurality of pages before the electronic device 101 provides the split screen. Alternatively, instead of the at least one icon 362, at least some of a plurality of icons for respectively indicating a plurality of applications installed in the electronic device 101 may be displayed in a portion of the second subregion 220.

The plurality of page indicators 361 may be displayed below the second page in the second subregion 220. A page indicator for indicating the second page of the plurality of page indicators 361 may be highlighted relative to the remaining page indicators.

In the state 360, the processor 160 may display the second page, to which switching from the first page is performed, in the first subregion 210, in response to drag input on the first page that is displayed in the first subregion 210. The processor 120 may display the first page, to which switching from the second page is performed, in a portion of the second subregion 220, in response to display of the second page, to which switching from the first page is performed, in the first subregion 210.

In the state 360, the processor 160 may display the first page, to which switching from the second page is performed, in a portion of the second subregion 220, in response to drag input on the second page, which is displayed in the portion of the second subregion 220. The processor 120 may display the second page, to which switching from the first page is performed, in the first subregion 210, in response to display of the first page, to which switching from the second page is performed, in the second subregion 220.

The processor 160 may switch from the single screen to the split screen in the first region on the basis of reception of specified input while the single screen is provided in the first region. In other words, the processor 160 may display the split screen, to which switching from the single screen is performed, in response to reception of the specified input.

Figure 4A:
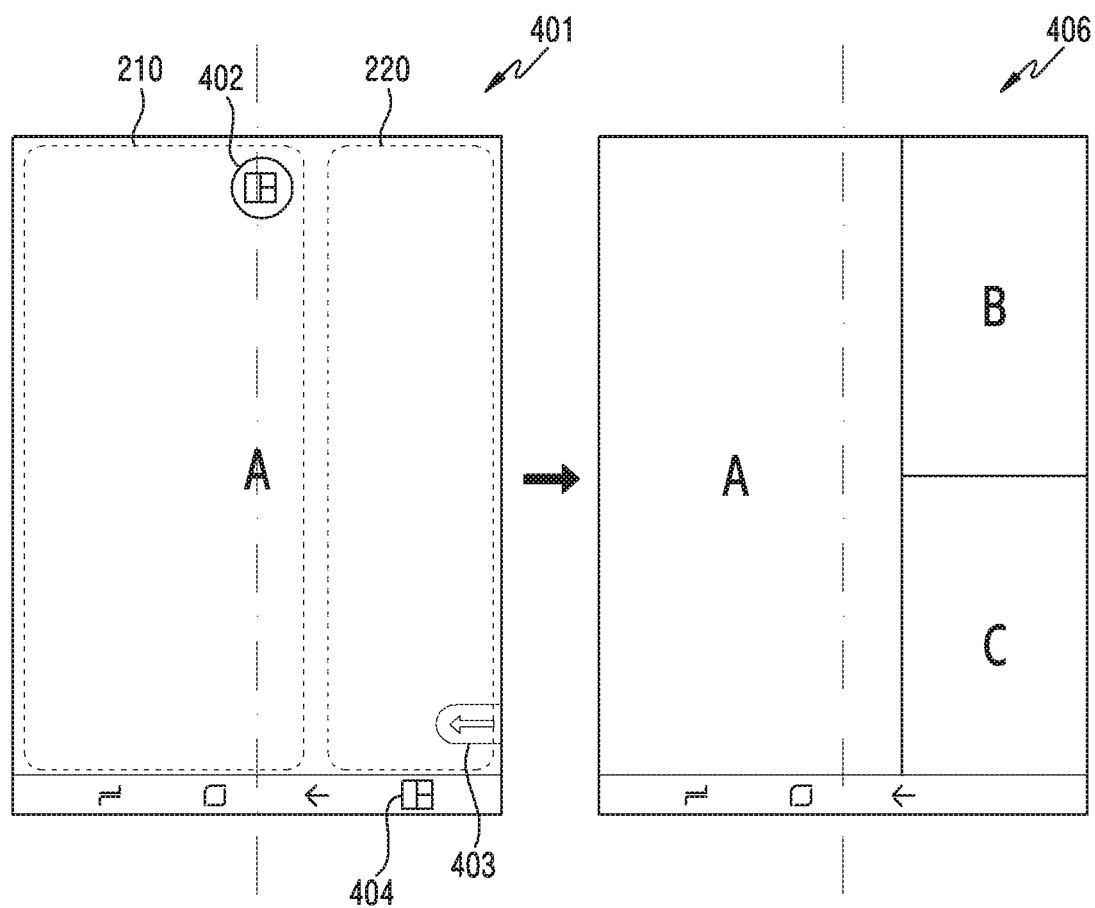
FIG. 4A is a diagram illustrating an example in which an electronic device switches from a state of displaying a single screen to a state of displaying a split screen according to an embodiment of the disclosure.

FIG. 4A is a diagram illustrating an example in which an electronic device switches from a state of displaying a single screen to a state of displaying a split screen according to an embodiment of the disclosure.

Referring to FIG. 4A, in a state 401, the processor 160 may display a first screen in the first region including the first subregion 210 and the second subregion 220. In the state 401, the processor 160 may switch from the state 401 to the state 406 in response to reception of the specified input. The state 406 may indicate the state of providing the split screen. The state 406 may indicate the state of displaying the first screen in the first subregion 210 and displaying a second screen and a third screen, distinct from the first screen, in the second subregion 220. The specified input may be implemented by various methods. For example, in the state 401, the processor 160 may further display an object 402 that is superimposed on the first screen and is usable for switching to the split screen. The processor 160 may switch from the state 401 to the state 406 in response to reception of a touch input on the object 402. As another example, in the state 401, the processor 160 may receive drag input 403 directed from an edge region of the first region to another region of the first region. The processor 160 may switch from the state 401 to the state 406 in response to reception of the drag input 403. As another example, in the state 401, the processor 160 may further display an object 404 in the second region (e.g., a control region) below the first region. The object 404 may be usable for switching to the split screen. The processor 160 may switch from the state 401 to the state 406 in response to reception of touch input on the object 404. As another example, when the display 140 is configured as a foldable display, the processor 160 may switch from the state 401 to the state 406 on the basis of a change in the posture of the electronic device 101. The change in the posture of the electronic device 101 may include a change in the angle between the first housing 110 and the second housing 120.

Figure 4B:
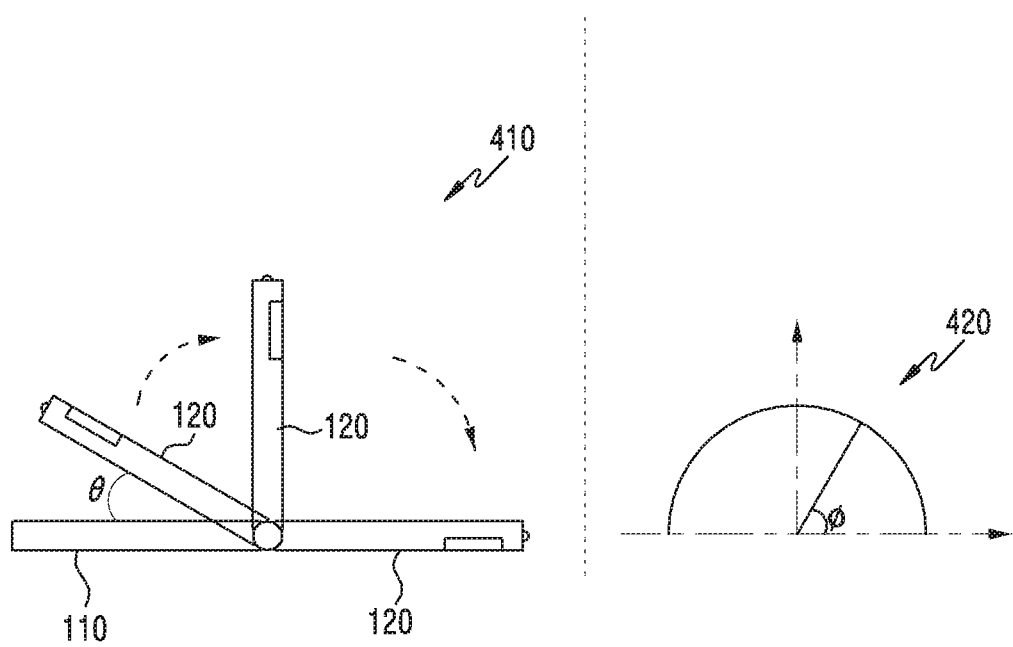
FIG. 4B is a diagram illustrating an example of changing the posture of an electronic device according to an embodiment of the disclosure.

FIG. 4B is a diagram illustrating an example of changing the posture of an electronic device according to an embodiment of the disclosure.

Referring to FIG. 4B, as shown in the state 410, the first housing 110 and the second housing 120 are connected to be pivotable via the foldable part 130, and the electronic device 101 may be in one of various postures depending on the angle between the first housing 110 and the second housing 120. The angle between the first housing 110 and the second housing 120 may be defined as shown in the graph 420. The state 401 may indicate the state in which the angle between the first housing 110 and the second housing 120 is beyond a specified range (e.g., the range of Ø to 180 degrees in the graph 420). The state 406 may indicate the state in which the angle between the first housing 110 and the second housing 120 falls within a designated range (e.g., the range of 0 to Ø degrees in the graph 420). The processor 160 may identify that the state of the electronic device 101 is changed from 401 to the state 406 in which the angle between the first housing 110 and the second housing 120 falls within the specified range, using the sensor circuit 180. The processor 160 may provide the split screen via the display 140 in response to the identification of the change to the state 406.

In the state 401, the configuration or arrangement of the first screen displayed in the first region may be different from the configuration or arrangement of the first screen displayed in the first subregion 210 in the state 406. For example, in the state 406, the first screen displayed in the first subregion 210 may provide content reduced in size from the content provided in the first screen displayed in the first region in the state 401. As another example, in the state 406, the arrangement of objects included in the first screen displayed in the first subregion 201 may be different from the arrangement of objects included in the first screen displayed in the first region in the state 401. However, the disclosure is not limited thereto.

In order to switch to the split screen, the processor 120 may record, in the memory 130 (e.g., graphic random access memory (GRAM)) related to the display 140, frame data associated with screens (e.g., the second screen and the third screen) to be newly displayed in the split screen, while only the first screen is displayed in the first region. The processor 120 may display the second screen and the third screen in the second subregion 220 by scanning the frame data stored in the memory, in response to reception of the specified input, in order to switch to the split screen. The electronic device 101 according to various embodiments of the present disclosure may record the frame data associated with the second screen and the third screen before the specified input is received, and thus may obviate the requirement to spend time updating the frame data after the specified input is received. In other words, the electronic device 101 according to various embodiments may more quickly switch to the split screen.

The processor 160 may change the arrangement of the split screen or the configuration of the split screen in response to reception of the specified input while the split screen is displayed using the display.

Figure 5A:
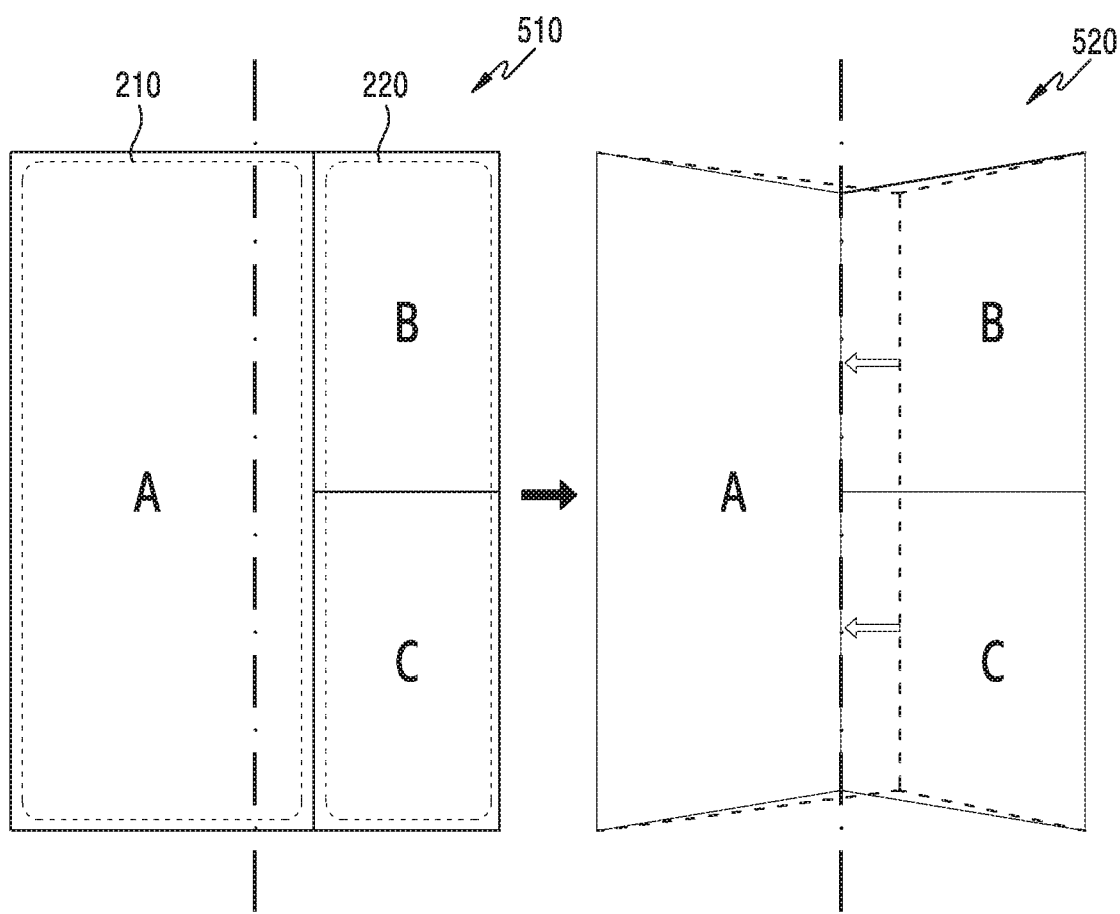
FIG. 5A is a diagram illustrating an example of changing the configuration of a split screen of an electronic device according to an embodiment of the disclosure.

FIG. 5A is a diagram illustrating an example of changing the configuration of a split screen of an electronic device according to an embodiment of the disclosure.

Referring to FIG. 5A, in a state 510, the processor 160 may display a first screen in the first subregion 210 and may display a second screen and a third screen in the second subregion 220. The processor 160 may identify or recognize that the state of the electronic device 101 is switched from the state 510 to the state 520 using the sensor circuit 180. The state 520 may indicate the state in which the angle between the first housing 110 and the second housing 120 falls within a specified range. In other words, the processor 160 may identify or recognize, using the sensor circuit 180, that the angle between the first housing 110 and the second housing 120 is changed from a first angle that is beyond the specified range to a second angle that falls within the specified range. The processor 160 may reduce a region for displaying the first screen and may enlarge a region for displaying the second screen and the third screen on the basis of the identification or recognition. For example, on the basis of the identification or the recognition, the processor 160 may display the first screen within a region including the first portion 270 and the second portion 275, and may display the second screen and the third screen within a region including the third portion 280 and the fourth portion 285. The processor 160 may further provide a visual effect of reducing the region for displaying the first screen and of enlarging the region for displaying the second screen and the third screen.

Figure 5B:
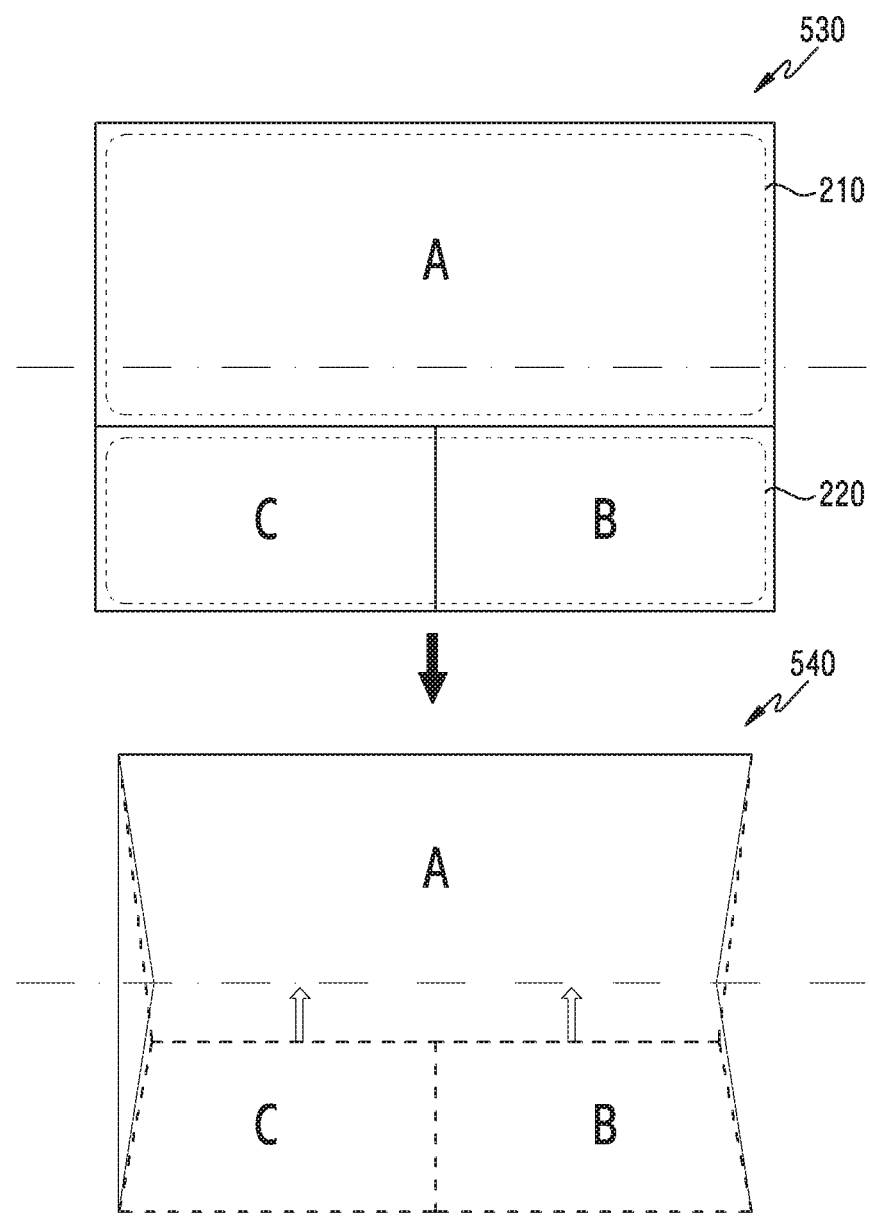
FIG. 5B is a diagram illustrating another example of changing the configuration of a split screen of an electronic device according to an embodiment of the disclosure.

FIG. 5B is a diagram illustrating another example of changing the configuration of a split screen of an electronic device according to an embodiment of the disclosure.

Referring to FIG. 5B, in a state 530, the processor 160 may display a first screen in the first subregion 210 and may display a second screen and a third screen in the second subregion 220. The processor 160 may identify or recognize that the state of the electronic device 101 is switched from the state 530 to a state 540 using the sensor circuit 180. The state 540 may be the state in which the angle between the first housing 110 and the second housing 120 falls within the specified range. In other words, the processor 160 may identify or recognize that the angle between the first housing 110 and the second housing 120 is changed from a first angle that is beyond the specified range to a second angle that falls within the specified range, using the sensor circuit 180. The processor 160 may reduce a region for displaying the first screen and may enlarge a region for displaying the second screen and the third screen, on the basis of the identification or recognition. For example, on the basis of the identification or the recognition, the processor 160 may display the first screen within a region including the first portion 270 and the second portion 275, and may display the second screen and the third screen within a region including the third portion 280 and the fourth portion 285. The processor 160 may provide a visual effect of reducing the region for displaying the first screen and of enlarging the region for displaying the second screen and the third screen.

Figure 6A:
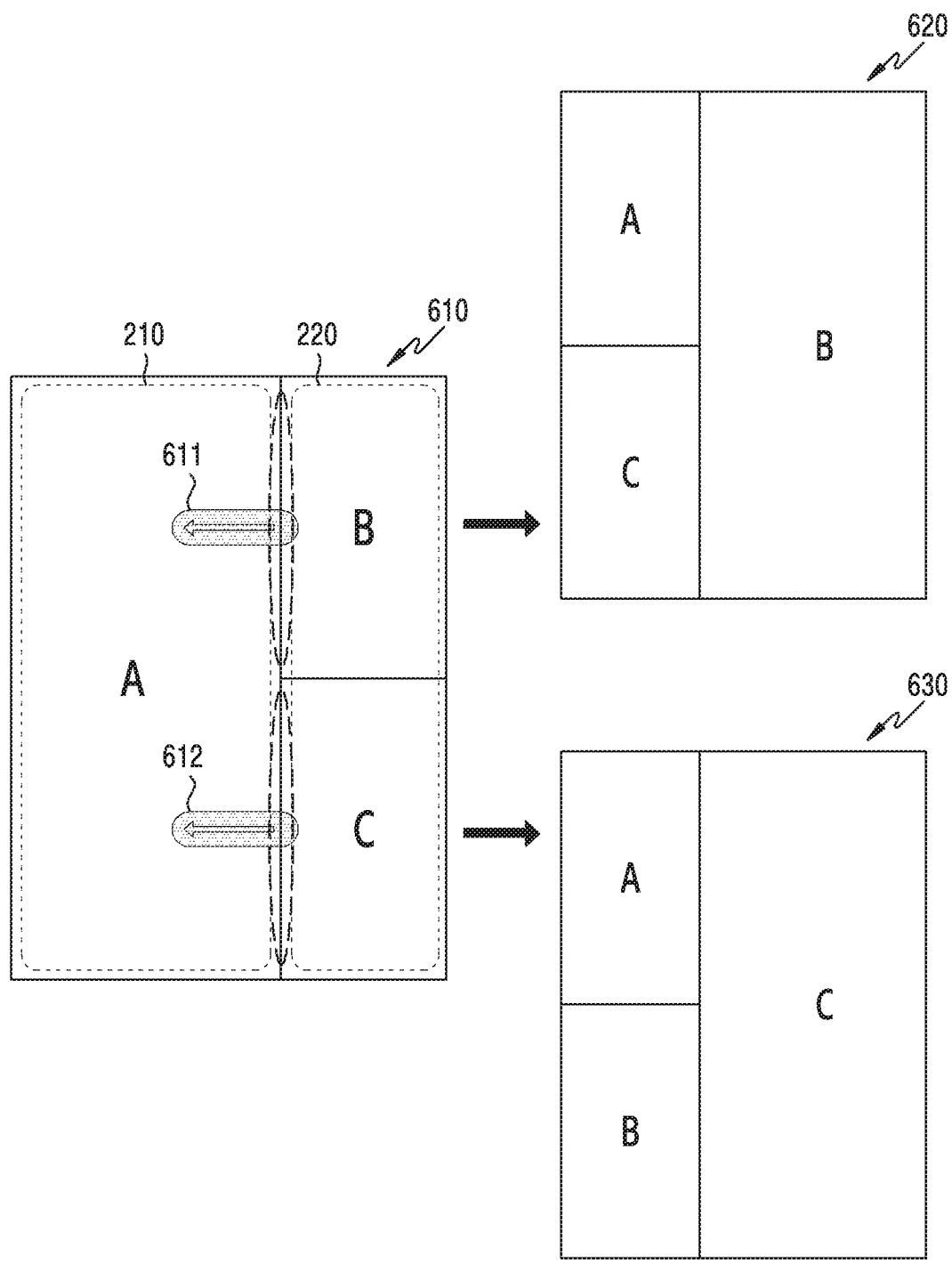
FIG. 6A is a diagram illustrating another example of changing the configuration of a split screen of an electronic device according to an embodiment of the disclosure.

FIG. 6A is a diagram illustrating another example of changing the configuration of a split screen of an electronic device according to an embodiment of the disclosure.

Referring to FIG. 6A, in a state 610, the processor 160 may display a first screen in the first subregion 210 and may display a second screen and a third screen in the second subregion 220. In the state 610, the processor 120 may receive a drag input 611 for dragging the boundary between the first screen and the second screen toward the first screen. The processor 160 may switch from the state 610 to a state 620 in response to the reception of the drag input 610. The state 620 may be the state of extending a region in which the second screen is displayed. The state 620 may be the state in which the region in which the second screen is displayed is a main display region. For example, in the state 620, the region in which the second screen is displayed may be a region including the second portion 275, the third portion 280, and the fourth portion 285. In the state 620, the first screen and the third screen may be displayed together in a region including the first portion 270. A region in which the first screen is displayed in the state 620 may be narrower than a region in which the first screen is displayed in the first subregion 210 in the state 610. The processor 120 may reduce the size of each of the components configured in the first screen using a different magnification on the basis of the attributes or type of each component by taking into consideration the reduction of a region. For example, in the state 620, at least one first component (e.g., an icon, an executable object, and the like) which is capable of receiving input (e.g., a touch input) among the components may be reduced in size using a first magnification (e.g., ×0.8), compared to the state 610. In the state 620, at least one second component (e.g., an image or the like) that is incapable of receiving input but requires high visibility among the components is reduced, compared to the state 610, using a second magnification (e.g., ×0.6), which is lower than the first magnification. In the state 620, the remaining components among the components may be reduced, compared to the state 610, using a third magnification (e.g., ×0.4), which is lower than both the first magnification and the second magnification. As another example, in the state 620, some of the components (e.g., an icon, an executable object, and the like) may maintain the sizes they had in the state 610, and some others may be reduced to be smaller than the sizes in the state 610. However, the disclosure is not limited thereto.

In the state 610, the processor 160 may receive a drag input 612 for dragging the boundary between the first screen and the third screen toward the first screen. The processor 160 may switch from the state 610 to a state 630 in response to the reception of the drag input 612. The state 630 may be the state of extending a region in which the third screen is displayed. The state 630 may be the state in which the region in which the third screen is displayed is a main display region. For example, in the state 630, the region in which the third screen is displayed may be a region including the second portion 275, the third portion 280, and the fourth portion 285. In the state 630, the first screen and the second screen may be displayed together in a region including the first portion 270. A region in which the first screen is displayed in the state 630 may be narrower than a region in which the first screen is displayed in the first subregion 210 in the state 610.

The processor 160 may reduce each of the components configured in the first screen using a different magnification on the basis of the attributes or type of each component by taking into consideration the reduction of a region. For example, in the state 630, at least one first component (e.g., an icon, an executable object, and the like), which is capable of receiving input (e.g., a touch input) among the components may be reduced using a first magnification (e.g., ×0.8), compared to the state 610. In the state 630, at least one second component (e.g., an image or the like) that is incapable of receiving input but requires a high visibility among the components is reduced in size, compared to the state 610, using a second magnification (e.g., ×0.6), which is lower than the first magnification. In the state 630, the remaining components among the components may be reduced, compared to the state 610, using a third magnification (e.g., ×0.4), which is lower than the first magnification and the second magnification. As another example, in the state 630, some of the components (e.g., an icon, an executable object, and the like) may maintain the sizes they had in the state 610, and some others may be reduced to be smaller than the sizes in the state 610. However, the disclosure is not limited thereto.

Figure 6B:
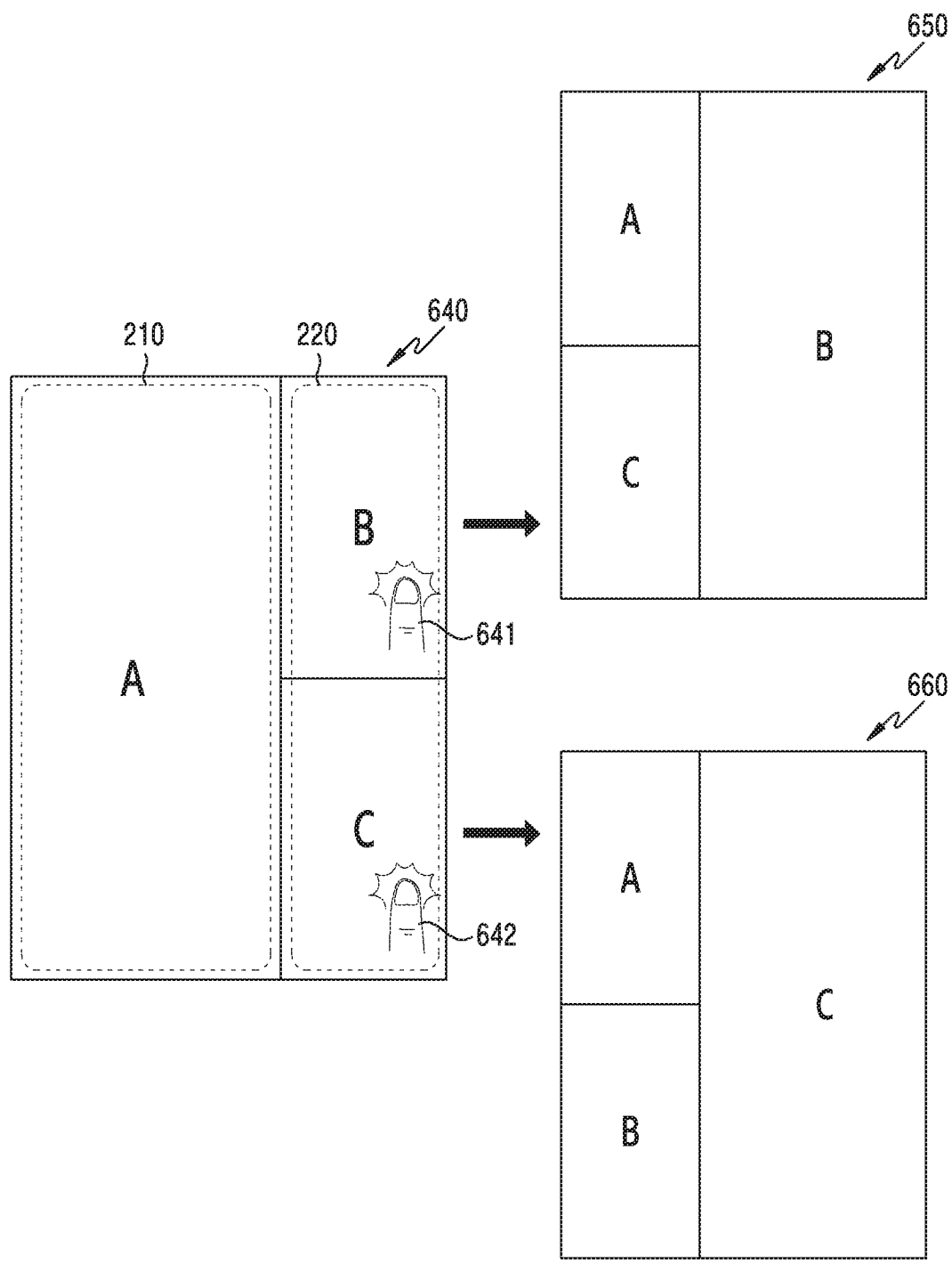
FIG. 6B is a diagram illustrating another example of changing the configuration of a split screen of an electronic device according to an embodiment of the disclosure.

FIG. 6B is a diagram illustrating another example of changing the configuration of a split screen of an electronic device according to an embodiment of the disclosure.

Referring to FIG. 6B, in a state 640, the processor 160 may display a first screen in the first subregion 210 and may display a second screen and a third screen in the second subregion 220. The processor 160 may receive input 641 to the second screen in the state 640. The attributes of the input 641 may be variously configured. For example, when an executable object does not exist in the second screen, or when performing a designated function in the second screen is not allowed, the input 641 may be configured as a single-tap input to the second screen. As another example, when an executable object exists in the second screen or when performing a designated function in the second screen is allowed, the input 641 may be configured as a double-tap input or a force touch input, which is distinct from the single-tap input. However, the disclosure is not limited thereto.

The processor 160 may switch from the state 640 to a state 650 in response to the reception of the input 641. The state 650 may be the state of extending a region for displaying the second screen. The state 650 may be the state in which a region for displaying the second screen is a main display region. For example, in the state 650, the region in which the second screen is displayed may be a region including the second portion 275, the third portion 280, and the fourth portion 285. In the state 650, the first screen and the third screen may be displayed together in a region including the first portion 270. The region in which the first screen is displayed in the state 650 may be narrower than the region in which the first screen is displayed in the first subregion 210 in the state 610. The processor 120 may reduce each of the components configured in the first screen using a different magnification on the basis of the attributes or type of each component by taking into consideration the reduction of a region. For example, in the state 650, at least one first component (e.g., an icon, an executable object, and the like), which is capable of receiving input (e.g., a touch input), among the components may be reduced using a first magnification (e.g., ×0.8), compared to the state 610. In the state 650, at least one second component (e.g., an image or the like) that is incapable of receiving input but requires a high visibility among the components is reduced, compared to the state 610, using a second magnification (e.g., ×0.6), which is lower than the first magnification. In the state 650, the remaining components among the components may be reduced, compared to the state 610, using a third magnification (e.g., ×0.4), which is lower than the first magnification and the second magnification. As another example, in the state 650, some of the components (e.g., an icon, an executable object, and the like) may maintain the sizes they had in the state 610, and some others may be reduced to be smaller than the sizes in the state 610. However, the disclosure is not limited thereto.

The processor 160 may receive an input 642 to the third screen in the state 640. The processor 160 may switch from the state 640 to a state 660 in response to reception of the drag input 642. The state 660 may be the state of extending a region for displaying the second screen. According to various embodiments, the state 660 may be the state in which a region in which the third screen is displayed is a main display region. For example, in the state 660, the region in which the third screen is displayed may be a region including the second portion 275, the third portion 280, and the fourth portion 285. In the state 660, the first screen and the second screen may be displayed together in a region including the first portion 270. The region in which the first screen is displayed in the state 660 may be narrower than the region in which the first screen is displayed in the first subregion 210 in the state 610. The processor 120 may reduce each of the components configured in the first screen using a different magnification on the basis of the attributes or type of each component, by taking into consideration the reduction of a region. For example, in the state 660, at least one first component (e.g., an icon, an executable object, and the like), which is capable of receiving input (e.g., a touch input), among the components may be reduced in size using a first magnification (e.g., ×0.8), compared to the state 610. In the state 660, at least one second component (e.g., an image or the like) that is incapable of receiving input but requires high visibility among the components is reduced in size, compared to the state 610, using a second magnification (e.g., ×0.6), which is lower than the first magnification. In the state 660, the remaining components among the components may be reduced, compared to the state 610, using a third magnification (e.g., ×0.4) which is lower than the first magnification and the second magnification. However, the disclosure is not limited thereto. As another example, in the state 660, some of the components (e.g., an icon, an executable object, and the like) may maintain the sizes they had in the state 610, and some others may be reduced to be smaller than the sizes in the state 610. However, the disclosure is not limited thereto.

According to various embodiments of the present disclosure, the processor 160 may switch from the split screen to a single screen in response to reception of a specified input while the split screen is displayed using the display 140.

Figure 7:
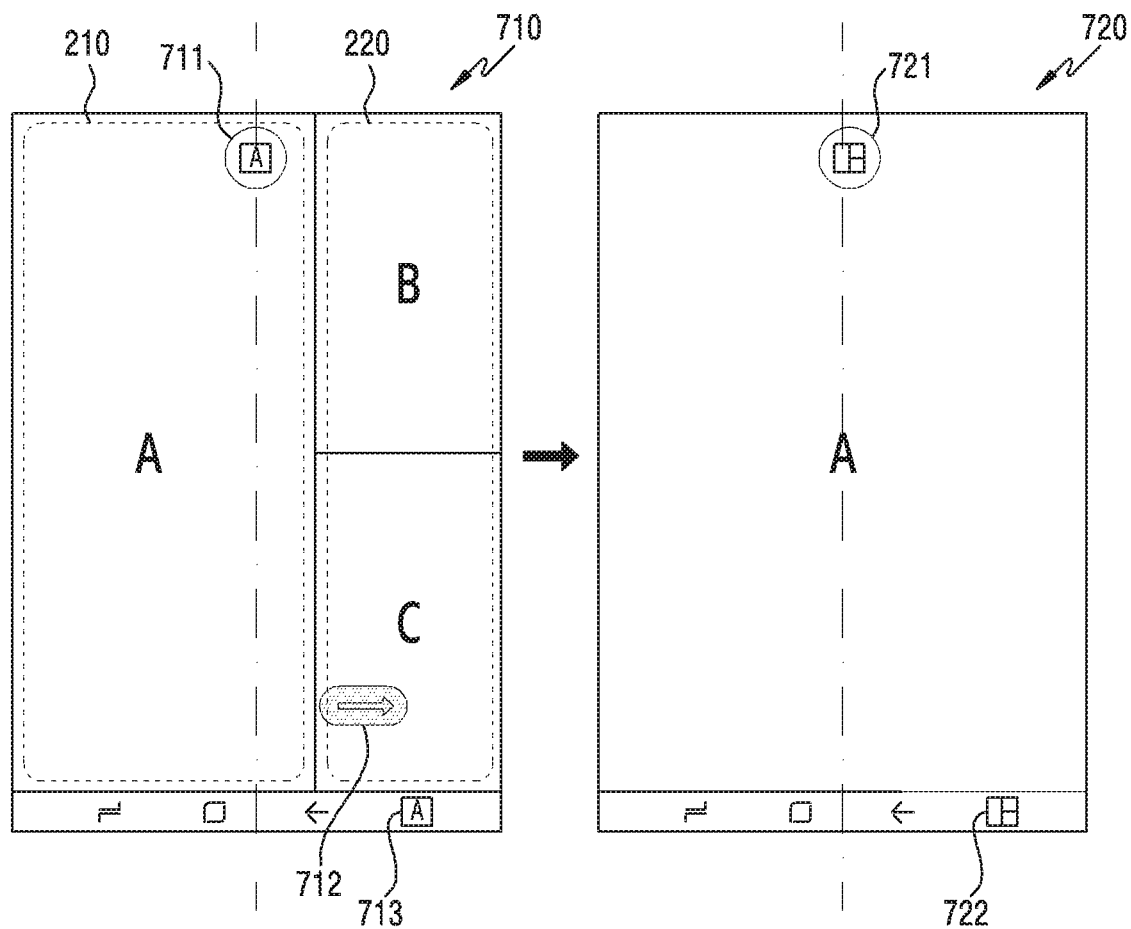
FIG. 7 is a diagram illustrating an example in which an electronic device switches from a state of displaying a split screen to a state of displaying a single screen according to an embodiment of the disclosure.

FIG. 7 is a diagram illustrating an example in which an electronic device switches from a state of displaying a split screen to a state of displaying a single screen according to an embodiment of the disclosure.

Referring to FIG. 7, in a state 710, the processor 160 may display a first screen in the first subregion 210 and may display a second screen and a third screen in the second subregion 220.

In the state 710, the processor 160 may further display an object 711. The object 711 may be superimposed on or float on at least one of the first screen or the second screen. The object 711 may be moved by a drag input. The object 711 may further include a thumbnail image for showing the first screen to be displayed in the first region configured with the first subregion 210 and the second subregion 220. The processor 160 may switch from the state 710 to a state 720 in response to reception of an input to the object 711 in the state 710. The state 720 may be the state of displaying the first screen in the first region configured with the first subregion 210 and the second subregion 220. In the state 720, the second screen and the third screen, which were displayed in the second subregion 220 in the state 710, may disappear. When at least one of the second screen or the third screen, which were displayed in the second subregion 220 in the state 710, corresponds to an execution screen of an application, the application may be switched from a foreground state to a background state. In the state 720, the processor 120 may further include an object 721 for restoring the state 710 in the first region. Switching from the object 721 to the object 711 may be performed, and the processor 120 may restore the state 710 from the state 720 when receiving input to the object 721 in the state 720.

In the state 710, the processor 160 may receive drag input 712 directed from an edge region of the first subregion 210 toward the second subregion 220. The processor 160 may switch from the state 710 to the state 720 in response to the reception of the drag input 712. The processor 160 may restore the state 710 from the state 720 when receiving drag input directed from an edge region of the first region to another region in the state 720.

In the state 710, the processor 160 may further display an object 713 in the second region (e.g., a control region) below the first subregion 210 and the second subregion 220. The object 713 may further include a thumbnail image for showing the first screen to be displayed in the first region configured with the first subregion 210 and the second subregion 220. The processor 160 may switch from the state 710 to the state 720 in response to reception of input to the object 713. In the state 720, the processor 160 may further include an object 722 for restoring the state 710 in the second region. Switching from the object 722 to the object 713 may be performed, and the processor 120 may restore the state 710 from the state 720 when receiving input to the object 722 in the state 720.

In the state 710, the processor 160 may identify that the angle between the first housing 110 and the second housing 120 is changed from the second angle, which falls within the specified range, to the first angle, which is beyond the specified range. The processor 160 may switch from the state 710 to the state 720 in response to the identification. However, the disclosure is not limited thereto.

As described above, an electronic device (e.g., the electronic device 101) according to various embodiments of the present disclosure may include at least one memory (e.g., the memory 170) storing instructions; a display (e.g., the display 140); and at least one processor (e.g., the processor 160). The at least one processor is, when executing the instructions, configured to display a first screen in a first region using the display; while displaying the first screen in the first region, receive a specified input; and in response to receiving the specified input, display at least a portion of the first screen in a first subregion included in the first region and display a second screen and a third screen in a second subregion, which is included in the first region and is disposed beside the first subregion, wherein the area of the first subregion is larger than the area of the second subregion.

According to various embodiments of the present disclosure, the third screen may be displayed below the second screen.

According to various embodiments of the present disclosure, the at least one processor may be, when executing the instructions, configured to display, in the first region, the first screen corresponding to a user interface of a first application in a foreground; and in response to receiving the specified input, display at least the portion of the first screen in the first subregion and display, in the second subregion, the second screen corresponding to a user interface of a second application among a plurality of applications that are in the background while the first application is in the foreground and the third screen corresponding to a user interface of a third application among the plurality of applications. For example, the second application may be an application that was in the foreground immediately before the first application was brought to the foreground, and the third application may be an application that was in the foreground immediately before the second application was brought to the foreground or an application that was in the foreground while the second application was in the foreground.

According to various embodiments of the present disclosure, the at least one memory may include a memory configured to store frame data regarding a screen to be displayed in the display, wherein the memory is configured to store frame data regarding the second screen and the third screen to be displayed in the second subregion before receiving the specified input, and, in response to receiving the specified input, the at least one processor is configured to display the second screen and the third screen in the second subregion by scanning the frame data regarding the second screen and the third screen stored in the memory.

According to various embodiments of the present disclosure, the at least one processor may be, when executing the instructions, configured to display, in the first region, the first screen including a first page among a plurality of pages included in a home screen and at least one icon that is maintained independently from input for switching from the first page to any one page among the plurality of pages; and in response to receiving the specified input, display the first page in the first subregion and display a second page among the plurality of pages and the at least one icon in the second subregion.

According to various embodiments of the present disclosure, the electronic device may further include a first housing including a first surface and a second surface facing opposite direction of the first surface (e.g., the first housing 110); a second housing (e.g., the second housing 120) including a third surface and a fourth surface facing opposite direction of the third surface; and a folding part (e.g., the folding part 130) pivotably connecting a side surface of the first housing with the side surface of the second housing that faces the side surface of the first housing.

The display may include a flexible display disposed on the first surface and the third surface across the folding part. The first region may include a first portion that is on the first surface; a second portion that is on the first surface and the folding part and that is beside the first portion; a third portion that is on the third surface; and a fourth portion that is on the third surface and the folding part and that is beside the third portion. The first subregion may be configured with the first portion, the second portion, and the third portion, and the second subregion is configured with the fourth portion. The specified input may correspond to an input for changing the angle between the first housing and the second housing from a first angle that is beyond a specified range to a second angle that falls within the specified range while displaying the first screen in the first region. The specified input may be a touch input on an executable object displayed together with the first screen within a region including the second portion and the fourth portion. The electronic device may further include a plurality of touch sensors that are disposed on the flexible display, wherein the at least one processor is, when executing the instructions, configured to: in response to receiving the specified input, disable touch sensors disposed on the second portion and the fourth portion, among the plurality of touch sensors.

According to various embodiments of the present disclosure, the specified input may correspond to drag input of dragging an edge portion of the first region toward another portion of the first region.

According to various embodiments of the present disclosure, the at least one processor may be, when executing the instructions, configured to while displaying at least the portion of the first screen in the first subregion and displaying the second screen and the third screen in the second subregion, receive input for dragging a boundary between at least the portion of the first screen and the second screen toward at least the portion of the first screen; in response to receiving the input, display the second screen at an enlarged size and display the first screen and the third screen at a reduced size; while displaying at least the portion of the first screen in the first subregion and displaying the second screen and the third screen in the second subregion, receive another input for dragging a boundary between at least the portion of the first screen and the third screen toward at least the portion of the first screen; and in response to receiving the other input, display the third screen at an enlarged size and display the first screen and the second screen at a reduced size.

According to various embodiments of the present disclosure, when executing the instructions, the at least one processor may be further configured to receive a touch input on the second screen while at least a portion of the first screen is displayed in the first subregion and the second screen and the third screen are displayed in the second subregion; and display the second screen in the first subregion and display the first screen and the third screen in the second subregion in response to reception of the touch input on the second screen. The second screen displayed in the first subregion may be enlarged relative to the second screen that was displayed in the second subregion, and the first screen displayed in the second subregion may be reduced relative to the first screen that was displayed in the first subregion.

According to various embodiments of the present disclosure, the aspect ratio of the first subregion may correspond to the aspect ratio of a part of the second subregion in which the second screen is displayed, and may correspond to the aspect ratio of a part of the second subregion in which the third screen is displayed.

According to various embodiments of the present disclosure, the first screen may correspond to an execution screen of an application, the second screen may correspond to a screen for accessing at least one application that has been executed before executing the application, and the third screen may correspond to a virtual keyboard.

Figure 8:
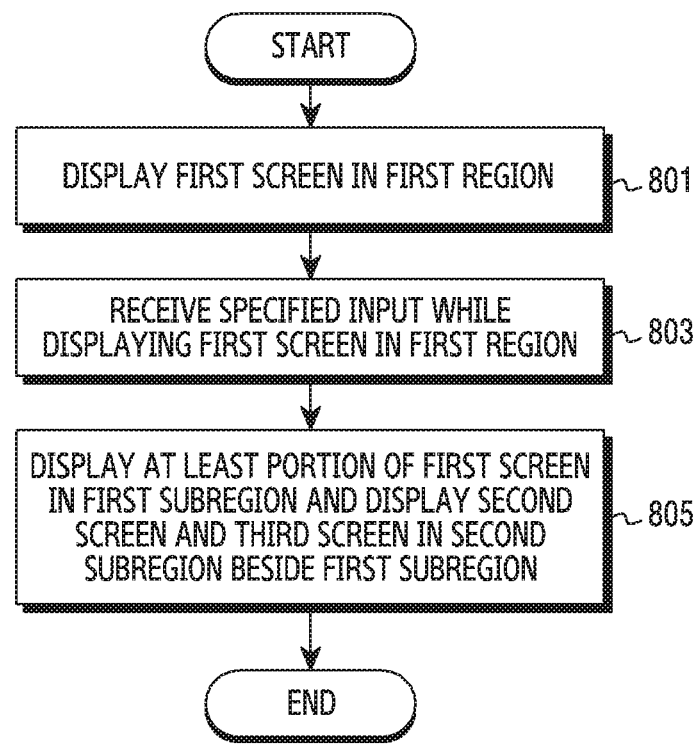
FIG. 8 is a diagram illustrating an example of the operation of an electronic device according to an embodiment of the disclosure.

FIG. 8 is a diagram illustrating an example of the operation of an electronic device according to an embodiment of the disclosure. The operation may be performed by the electronic device 101 illustrated in FIG. 1A or by the processor 160 included in the electronic device 101.

Referring to FIG. 8, the processor 160 may display a first screen in a first region in operation 801. The first region may be displayed together with at least one of a second region and a third region. For example, the second region may be disposed below the first region, and may be a control region. As another example, the third region may be disposed above the first region, and may be an indicator region. At least one of the second region or the third region may be maintained independently from a change in the content displayed in the first region. At least one of the second region or the third region may disappear depending on the attribute or type of content displayed in the first region. The first screen may be displayed in the entire first region. The state of displaying the first screen in the entire first region may be defined as the state of displaying a single screen.

In operation 803, the processor 160 may receive a specified input while displaying the first screen in the first region. The specified input may be input for switching from the state of displaying a single screen to the state of displaying the split screen.

The first screen may have one of various types. For example, the processor 160 may display, in the first region, the first screen corresponding to a user interface of a first application running in the foreground. As another example, the processor 160 may display, in the first region, the first screen including a first page among a plurality of pages included in a home screen and at least one icon (e.g., top 5 application icons) maintained independently from input for switching from the first page to any one of the plurality of pages.

In operation 805, the processor 160 may display at least a portion of the first screen in a first subregion included in the first region, and may display a second screen and a third screen in a second subregion that is included in the first region and is disposed beside the first subregion, in response to reception of the specified input. The area of the first subregion may be larger than the area of the second subregion. The electronic device 101 according to various embodiments may configure the area of the first subregion to be larger than the area of the second subregion in order to enable a user to intuitively recognize a main display region. The third screen may be displayed below the second screen.

The first screen, the second screen, and the third screen may be configured as various types.

For example, when the first screen that was displayed in the first region corresponds to the user interface of the first application in the foreground, the processor 160, in response to reception of the specified input, may display at least a portion of the user interface of the first application in the first subregion, and may display the second screen, which corresponds to a user interface of a second application, among a plurality of applications being in the background while the first application is in the foreground, and the third screen, which corresponds to a user interface of a third application, among the plurality of applications, in the second subregion. The second application may be an application that was in the foreground immediately before the first application is in the foreground. The third application may be an application that was in the foreground immediately before the second application was brought to the foreground, or an application that was in the foreground while the second application was in the foreground.

As another example, when the first screen that was displayed in the first region includes a first page, among a plurality of pages included in a home screen, and at least one icon, the processor 160, in response to reception of the specified input, may display the first page in the first subregion and may display a second page, among the plurality of pages and the at least one icon, in the second subregion.

As another example, when the first screen that was displayed in the first region corresponds to an execution screen of an application, the processor 120, in response to reception of the specified input, may display the execution screen of the application at a reduced size in the first subregion, and may display the second screen, which is a screen for accessing at least one application that was executed before the application is executed, and the third screen, including a virtual keyboard, in the second subregion. However, the disclosure is not limited thereto.

As described above, the electronic device 101 according to various embodiments of the present disclosure may switch from the state of displaying the single screen to the state of displaying the split screen in response to reception of the specified input. The electronic device 101 may switch from the state of displaying the single screen to the state of displaying the split screen using the specified input without any other input, thereby providing an improved user experience. Also, when providing the split screen, the electronic device 101 may provide at least a portion of the first screen, which was provided in the single-screen state, via the first subregion, which is larger than the second subregion, thereby providing guidance that enables a user to intuitively identify which region is the main region.

Figure 9:
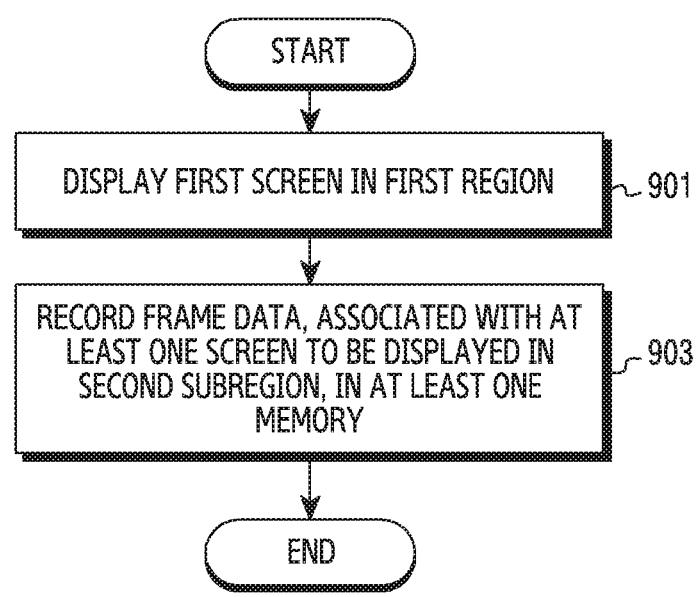
FIG. 9 is a diagram illustrating an example of an operation by an electronic device of recording frame data associated with at least one screen to be displayed in a second subregion in at least one memory before receiving a specified input, according to an embodiment of the disclosure.

FIG. 9 is a diagram illustrating an example of an operation by an electronic device of recording frame data associated with at least one screen to be displayed in a second subregion in at least one memory before receiving a specified input according to an embodiment of the disclosure. The operation may be performed by the electronic device 101 illustrated in FIG. 1A or by the processor 160 included in the electronic device 101.

Referring to FIG. 9, operations 901 and 903 of FIG. 9 may be related to operation 801 of FIG. 8.

The processor 160 may display the first screen in the first region in operation 901. In other words, the processor 160 may display the single screen by displaying the first screen in the entire first region.

In operation 903, the processor 160 may record frame data associated with the second screen and the third screen to be displayed in the second subregion in at least one memory of the electronic device 101 while the first screen is displayed in the first region. The at least one memory may correspond to the memory 170. The at least one memory may correspond to a GRAM included in a display-driving circuit. The processor 120 may record the frame data associated with the second screen and the third screen to be displayed in the second subregion in the at least one memory before receiving the specified input. At least a portion of the frame data may have a mark such as a flag or the like in order to prevent the processor 160 from displaying a screen using the recorded frame data until the specified input is received. The mark may be implemented as a predetermined bit sequence, and may be implemented by recording the frame data at a designated address of the at least one memory. However, the disclosure is not limited thereto.

As described above, the electronic device 101 according to various embodiments of the present disclosure may record the frame data associated with the second screen and the third screen to be displayed in the second subregion in the at least one memory in advance, before receiving the specified input, and thus may quickly switch to the split screen with a fast response speed.

Figure 10:
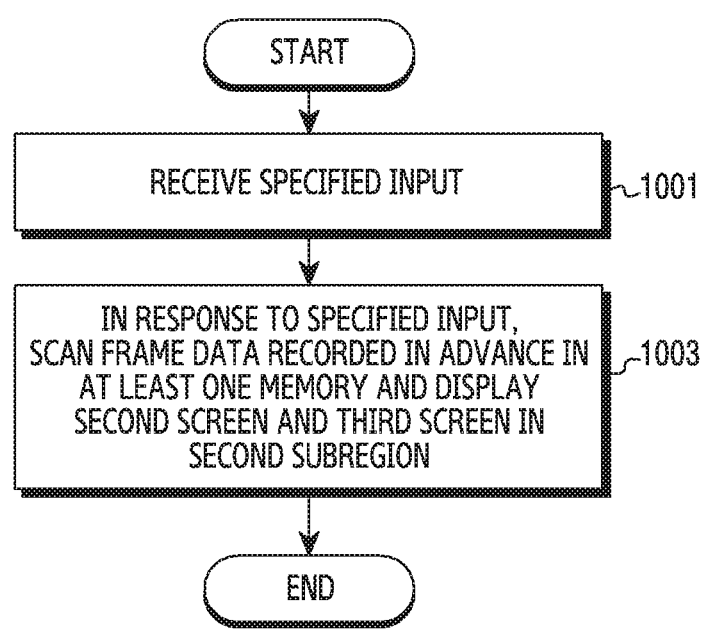
FIG. 10 is a diagram illustrating an example of an operation by an electronic device of displaying a second screen and a third screen on the basis of frame data recorded in advance according to an embodiment of the disclosure.

FIG. 10 is a diagram illustrating an example of an operation by an electronic device of displaying a second screen and a third screen on the basis of frame data recorded in advance according to an embodiment of the disclosure. The operation may be performed by the electronic device 101 illustrated in FIG. 1A or by the processor 160 included in the electronic device 101.

Referring to FIG. 10, operations 1001 and 1003 of FIG. 10 may be related to operations 803 and 805 of FIG. 8.

The processor 160 may receive the specified input while displaying the first screen in the first region in operation 1001. The processor 160 may record the frame data associated with the second screen and the third screen in the at least one memory in advance, and may receive the specified input in the state in which the first screen is displayed in the first region.

In operation 1003, in response to the specified input, the processor 160 may scan the frame data recorded in advance in the at least one memory, and may display the second screen and the third screen in the second subregion. In other words, the processor 160 may bypass or omit the operation of recording the frame data associated with the second screen and the third screen in the at least one memory (i.e., frame data updating). Such bypassing and omission may quickly implement switching to the split screen at a fast speed. The processor 160 may display the second screen and the third screen in the second subregion more quickly than an electronic device that records the frame data associated with the second screen and the third screen in the at least one memory, and scan the recorded frame data so as to display the second screen and the third screen in the second subregion after receiving the designated input.

Figure 11:
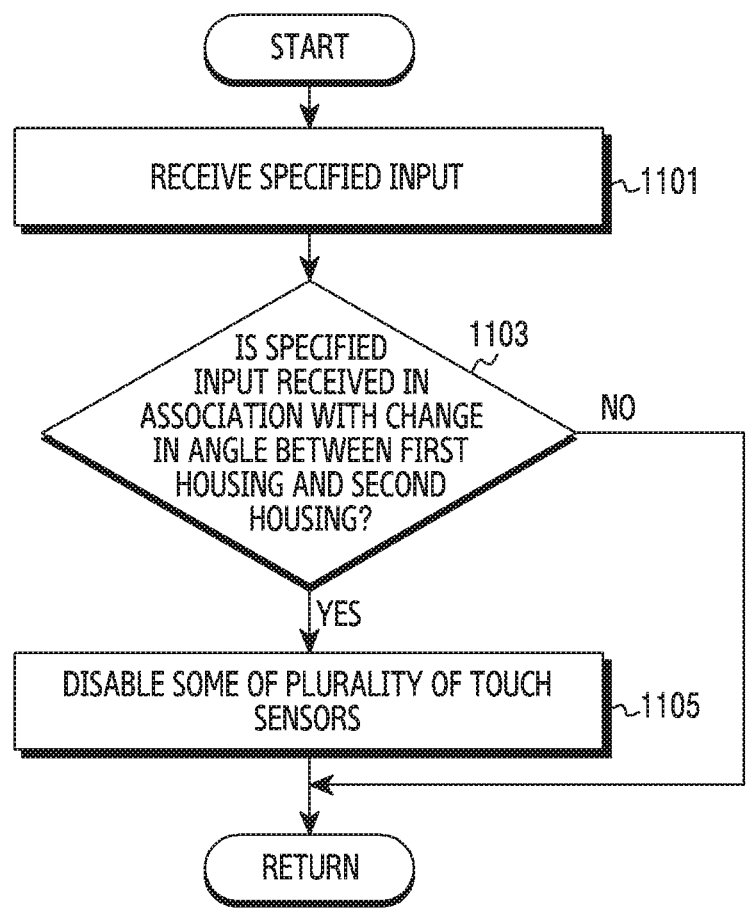
FIG. 11 is a diagram illustrating an example of an operation by an electronic device of disabling some of a plurality of touch sensors related to a display according to an embodiment of the disclosure.

FIG. 11 is a diagram illustrating an example of an operation by an electronic device of disabling some of a plurality of touch sensors related to a display according to an embodiment of the disclosure. The operation may be performed by the electronic device 101 illustrated in FIG. 1A or by the processor 160 included in the electronic device 101.

Referring to FIG. 11, operations 1101 to 1105 of FIG. 11 may be related to operation 803 of FIG. 8.

The processor 160 may receive the specified input while displaying the first screen in the first region in operation 1101.

In operation 1103, in response to reception of the specified input, the processor 160 may identify whether the specified input is received in association with a change in the angle between the first housing 110 and the second housing 120. For example, the processor 160 may identify the specified input using the sensor circuit 180, and may identify whether the specified input is received in association with a change in the angle between the first housing 110 and the second housing 120. When the specified input is received in association with the change in the angle between the first housing 110 and the second housing 120, the processor 160 may perform operation 1105. When the specified input is not received in association with the change in the angle between the first housing 110 and the second housing 120, the processor 160 may bypass operation 1105.

In operation 1105, the processor 160 may disable some of a plurality of touch sensors disposed on the display 140 on the basis of identifying that the specified input is received in association with the change in the angle between the first housing 110 and the second housing 120. For example, the processor 160 may disable the touch sensors disposed on the second portion 275 and the fourth portion 285, among the plurality of touch sensors disposed on the display 140, on the basis of identifying that the specified input is received in association with the change in the angle between the first housing 110 and the second housing 120. The disabled touch sensors may not be allowed to obtain power from a power management integrated circuit (PMIC) of the electronic device 101. The disabled touch sensors may operate at an operating frequency lower than the normal operating frequency. The touch sensors disposed on the second portion 275 and the fourth portion 285 may be touch sensors disposed in a region in which it is difficult to recognize a touch input since the display 140 is curved. The processor 160 may disable the touch sensors disposed on the second portion 275 and the fourth portion 285, thereby reducing the amount of power consumed by the touch sensors. The processor 160 may restrict the display of objects configured to receive a touch input in a region of the display 140 below the touch sensors disposed on the second portion 275 and the fourth portion 285, on the basis of identifying that the specified input is received in association with the change in the angle between the first housing 110 and the second housing 120. The objects that have been restricted from being displayed may be displayed in another region. However, the disclosure is not limited thereto.

As described above, the electronic device 101 according to various embodiments of the present disclosure may disable touch sensors disposed in a region in which it is difficult to recognize a touch input since the display 140, configured as a foldable display, is folded, and may reduce the amount of power consumed by the touch sensors.

Although FIG. 11 illustrates an example of disabling some of the plurality of sensors disposed on the display 140, the processor 160 may alternatively increase the operating frequency of some of the plurality of touch sensors so as to improve touch input sensitivity.

As described above, a method of operating an electronic device may include displaying a first screen in a first region using a display of the electronic device; while displaying the first screen in the first region, receiving a specified input; and in response to receiving the specified input, displaying at least a portion of the first screen in a first subregion included in the first region and displaying a second screen and a third screen in a second subregion, which is included in the first region and is disposed beside the first subregion, wherein the area of the first subregion is larger than the area of the second subregion.

According to various embodiments of the present disclosure, the operation of displaying the first screen in the first region may include displaying, in the first region, the first screen corresponding to a user interface of a first application in a foreground state, and the operation of displaying at least the portion of the first screen in the first subregion, and the operation of displaying the second screen and the third screen in the second subregion may include in response to receiving the specified input, displaying at least the portion of the first screen in the first subregion, and displaying, in the second subregion, the second screen, corresponding to a user interface of a second application among a plurality of applications that are in the background while the first application is in the foreground, and the third screen corresponding to a user interface of a third application among the plurality of applications.

According to various embodiments of the present disclosure, the operation of displaying the first screen in the first region may include displaying, in the first region, the first screen including a first page among a plurality of pages that are included in a home screen and at least one icon that is maintained independently from input for switching from the first page to any one page among the plurality of pages, and the operation of displaying at least the portion of the first screen in the first subregion, and displaying the second screen and the third screen in the second subregion may include displaying the first page in the first subregion and displaying a second page among the plurality of pages and the at least one icon in the second subregion, in response to receiving the specified input.

According to various embodiments of the present disclosure, the first screen may correspond to an execution screen of an application, the second screen may correspond to a screen for accessing at least one application that has been executed before executing the application, and the third screen corresponds to a virtual keyboard.

Methods stated in claims and/or specifications according to various embodiments of the present disclosure may be implemented by hardware, software, or a combination of hardware and software.

When the methods are implemented as software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure.

The programs (software modules or software) may be stored in nonvolatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, the programs may be stored in a memory configured as a combination of some or all thereof. Further, a plurality of such memories may be included.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described embodiments of the present disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
at least one memory storing instructions;
a first housing comprising a first surface and a second surface facing in an opposite direction of the first surface;
a second housing comprising a third surface and a fourth surface facing in an opposite direction of the third surface;
a folding part pivotably connecting a side surface of the first housing with a side surface of the second housing facing the side surface of the first housing;
a display comprising a flexible display disposed on the first surface and the third surface across the folding part; and
at least one processor,
wherein the at least one processor is, when executing the instructions, configured to:
display a first screen in a first region using the display,
while displaying the first screen in the first region, receive a specified input,
in response to receiving the specified input, display at least a portion of the first screen in a first subregion included in the first region and display a second screen and a third screen in a second subregion included in the first region, wherein the second subregion is beside the first subregion, and wherein the first subregion is a region larger than the second subregion,
while displaying at least the portion of the first screen in the first subregion and displaying the second screen and the third screen in the second subregion, receive a first input for dragging a boundary between at least the portion of the first screen and the second screen toward at least the portion of the first screen or a second input for dragging a boundary between at least the portion of the first screen and the third screen toward at least the portion of the first screen,
in response to receiving the first input, display the second screen at an enlarged size in the first subregion and display the first screen at a reduced size together with the third screen in the second subregion, and
in response to receiving the second input, display the third screen at an enlarged size in the first subregion and display the first screen at a reduced size together with the second screen in the second subregion,
wherein different components of the second subregion are displayed at different magnification levels based on a type of each of the different components, such that at least a first component of the different components maintains a size substantially equal to a size of the at least the first component prior to receiving the first input or the second input, and at least a second component of the different components is reduced or enlarged relative to a size of the at least the second component prior to receiving the first input or the second input, and
wherein the different components comprise a component which is capable of receiving input.

2. The electronic device of claim 1, wherein the third screen is displayed below the second screen.

3. The electronic device of claim 1, wherein the at least one processor is, when executing the instructions, further configured to:
display, in the first region, the first screen corresponding to a user interface of a first application executing in a foreground, and
in response to receiving the specified input:
display at least the portion of the first screen in the first subregion, and
display, in the second subregion, the second screen, corresponding to a user interface of a second application among a plurality of applications that are executing in a background while the first application is executing in the foreground, and the third screen, corresponding to a user interface of a third application among the plurality of applications.

4. The electronic device of claim 3,
wherein the second application corresponds to an application that is executing in the foreground immediately before the first application is executing in the foreground, and
wherein the third application corresponds to an application that is executing in the foreground immediately before the second application is executing in the foreground or an application that is executing in the foreground while the second application is executing in the foreground.

5. The electronic device of claim 3,
wherein the at least one memory comprises a memory configured to store frame data regarding a screen to be displayed in the display,
wherein the memory is configured to store frame data regarding the second screen and the third screen to be displayed in the second subregion before receiving the specified input, and
wherein the at least one processor is, when executing the instructions, further configured to, in response to receiving the specified input, display the second screen and the third screen in the second subregion by scanning the frame data regarding the second screen and the third screen stored in the memory.

6. The electronic device of claim 1, wherein the at least one processor is, when executing the instructions, further configured to:
display, in the first region, the first screen, including a first page among a plurality of pages included in a home screen and at least one icon that is maintained independently from an input for switching from the first page to any one page among the plurality of pages; and
in response to receiving the specified input, display the first page in the first subregion and display a second page among the plurality of pages and the at least one icon in the second subregion.

7. The electronic device of claim 1,
wherein the first region comprises:
a first portion that is on the first surface,
a second portion that is on the first surface and the folding part and that is beside the first portion,
a third portion that is on the third surface, and
a fourth portion that is on the third surface and the folding part and that is beside the third portion,
wherein the first subregion is configured with the first portion, the second portion, and the fourth portion, and
wherein the second subregion is configured with the third portion.

8. The electronic device of claim 7, wherein the specified input corresponds to an input for changing an angle between the first housing and the second housing from a first angle outside a specified range to a second angle within the specified range while displaying the first screen in the first region.

9. The electronic device of claim 7, wherein the specified input corresponds to a touch input on an executable object displayed with the first screen within a region comprising the second portion and the fourth portion.

10. The electronic device of claim 7, further comprising:
a plurality of touch sensors that are disposed on the flexible display,
wherein the at least one processor is, when executing the instructions, further configured to, in response to receiving the specified input, disable touch sensors disposed on the second portion and the fourth portion among the plurality of touch sensors.

11. The electronic device of claim 7, wherein the specified input corresponds to a drag input of dragging an edge portion of the first region toward another portion of the first region.

12. The electronic device of claim 7, further comprising:
a sensor disposed in at least one of the first housing or the second housing,
wherein the at least one processor is, when executing the instructions, further configured to:
while displaying at least the portion of the first screen in the first subregion and displaying the second screen and the third screen in the second subregion, identify, using the sensor, that a state of the electronic device is changed from a first state in which an angle between the first housing and the second housing is outside a specified range to a second state in which the angle is within the specified range, and
based on the identification, display the first screen in the first portion and the second portion by reducing a display region of the first screen and display the second screen and the third screen in the third portion and the fourth portion by enlarging a display region of the second screen and the third screen.

13. The electronic device of claim 12, wherein the at least one processor is, when executing the instructions, further configured to:
provide a visual effect while reducing the display region of the first screen and enlarging the display region of the second screen and the third screen.

14. The electronic device of claim 1, wherein an aspect ratio of the first subregion corresponds to an aspect ratio of a part of the second subregion in which the second screen is displayed and corresponds to an aspect ratio of a part of the second subregion in which the third screen is displayed.

15. The electronic device of claim 1, wherein the first screen corresponds to an execution screen of an application, the second screen corresponds to a screen for accessing at least one application that has been executed before executing the application, and the third screen corresponds to a virtual keyboard.

16. A method executed in an electronic device with a display, the method comprising:
   displaying a first screen in a first region using the display;
   while displaying the first screen in the first region, receiving a specified input;
   in response to receiving the specified input, displaying at least a portion of the first screen in a first subregion included in the first region and displaying a second screen and a third screen in a second subregion included in the first region, wherein the second subregion is beside the first subregion, and the first subregion is a region larger than the second subregion;
   while displaying at least the portion of the first screen in the first subregion and displaying the second screen and the third screen in the second subregion, receiving a first input for dragging a boundary between at least the portion of the first screen and the second screen toward at least the portion of the first screen or a second input for dragging a boundary between at least the portion of the first screen and the third screen toward at least the portion of the first screen;
   in response to receiving the first input, displaying the second screen at an enlarged size in the first subregion and displaying the first screen at a reduced size together with the third screen in the second subregion; and
   in response to receiving the second input, displaying the third screen at an enlarged size in the first subregion and displaying the first screen at a reduced size together with the second screen in the second subregion,
   wherein different components of the second subregion are displayed at different magnification levels based on a type of each of the different components, such that at least a first component of the different components maintains a size substantially equal to a size of the at least the first component prior to receiving the first input or the second input, and at least a second component of the different components is reduced or enlarged relative to a size of the at least the second component prior to receiving the first input or the second input, and
   wherein the different components comprise a component which is capable of receiving input.

17. The method of claim 16,
wherein the displaying of the first screen in the first region comprises displaying, in the first region, the first screen corresponding to a user interface of a first application in a foreground, and
wherein the displaying at least the portion of the first screen in the first subregion and displaying the second screen and the third screen in the second subregion comprises, in response to receiving the specified input:
   displaying at least the portion of the first screen in the first subregion, and
   displaying, in the second subregion, the second screen, corresponding to a user interface of a second application among a plurality of applications that are in a background while the first application is in the foreground, and the third screen, corresponding to a user interface of a third application, among the plurality of applications.

18. The method of claim 16,
wherein the displaying the first screen in the first region comprises displaying, in the first region, the first screen including a first page among a plurality of pages that are included in a home screen and at least one icon that is maintained independently from an input for switching from the first page to any one page among the plurality of pages, and
wherein the displaying at least the portion of the first screen in the first subregion and displaying the second screen and the third screen in the second subregion comprises, in response to receiving the specified input:
   displaying the first page in the first subregion, and
   displaying a second page among the plurality of pages and the at least one icon in the second subregion.

19. The method of claim 16,
wherein the first screen corresponds to an execution screen of an application,
wherein the second screen corresponds to a screen for accessing at least one application that has been executed before executing the application, and
wherein the third screen corresponds to a virtual keyboard.

20. The method of claim 16, further comprising:
receiving an input on one of the at least a portion of the first screen, the second screen, or the third screen; and
in response to the input:
   changing a size of at least two of the at least a portion of the first screen, the second screen, or the third screen, and
   changing a subregion in which at least two of the first screen, the second screen, or the third screen are displayed.

* * * * *